United States Patent [19]

Katznelson et al.

[11] Patent Number: 4,998,287

[45] Date of Patent: Mar. 5, 1991

[54] DETERMINATION OF SEQUENTIAL POSITIONS OF VIDEO FIELDS DERIVED FROM FILM

[75] Inventors: Ron D. Katznelson; Edward A. Krause, both of San Diego, Calif.

[73] Assignee: General Instrument Corporation, New York, N.Y.

[21] Appl. No.: 257,712

[22] Filed: Oct. 14, 1988

[51] Int. Cl.$^5$ ............................................... H04N 3/36
[52] U.S. Cl. ....................................... 382/34; 358/214
[58] Field of Search ................................. 358/214–216; 382/30, 34

[56] References Cited

U.S. PATENT DOCUMENTS

| | | | |
|---|---|---|---|
| 4,418,360 | 11/1983 | Glasgow | 358/214 |
| 4,641,188 | 2/1987 | Dischert | 358/214 |
| 4,680,638 | 7/1987 | Childs | 358/214 |
| 4,814,885 | 3/1989 | Beard | 358/214 |
| 4,914,520 | 4/1990 | Beard | 358/214 |
| 4,933,759 | 6/1990 | van der Meer et al. | 358/214 |

OTHER PUBLICATIONS

Tsinberg, "Phillips NTSC-Compatible Two-Channel Television System", Third International Colloquium on Advanced Television Systems: HDTV87, Oct. 4–8, 1987, Ottawa, Canada.

Isnardi, et., "A Single Channel, NTSC Compatible Widescreen EDTV Syst., Third International Colloquium on Advanced Television Systems": HDTV87, Oct. 4–8, Ottawa, Canada.

Lucas, "B-MAC and HDTV-How Does It Fit?" Third International Colloquium on Advanced Television Systems: HDTV87, Oct. 4–8, Ottawa, Canada.

Poetsch, et al. "FDL 60-Progress in Film Scanning Using CCD Sensors and Digital Processing" International Broadcast Engineer, vol. 14, No. 190, Jul. 1983, pp. 46–48.

Primary Examiner—Stephen Brinich
Attorney, Agent, or Firm—Edward W. Callan

[57] ABSTRACT

A system for determining the sequential position of video fields of a received video signal that was derived from a film having successive image frames in accordance with the 3:2 pulldown method, wherein the video fields are produced at a greater rate than the film frame rate and in a predetermined repetitive sequentially varying relationship to the film frames wherein at predetermined positions in the sequence a video field is identical to the video field that preceded it by the duration of two video fields. The system includes means for delaying each field of the received video signal; means for comparing each received video field with a video field that has been delayed by the duration of two video fields; and means for comparing the results of a successive number of said comparisons with the predetermined sequence to determine when identical fields are located in only said predetermined positions in a sequence of the compared received video fields. A video signal processing system is synchronized by said determination that identical fields are located in only said predetermined positions in a sequence of the compared received video fields, for inserting indications of sequential video field position in the vertical blanking intervals preceding video fields that are received subsequent to said synchronizing determination. A counter times said comparisons of said compared results with the predetermined sequence and provides an indication that the received video fields were not so derived from film when a determination that identical fields are located in only said predetermined positions in a sequence of the compared received video fields, is not made within a predetermined time. This indication is used to set the mode of operation of a system for providing a progressive-scan video display in accordance with whether or not the received video signal was derived from film.

6 Claims, 11 Drawing Sheets

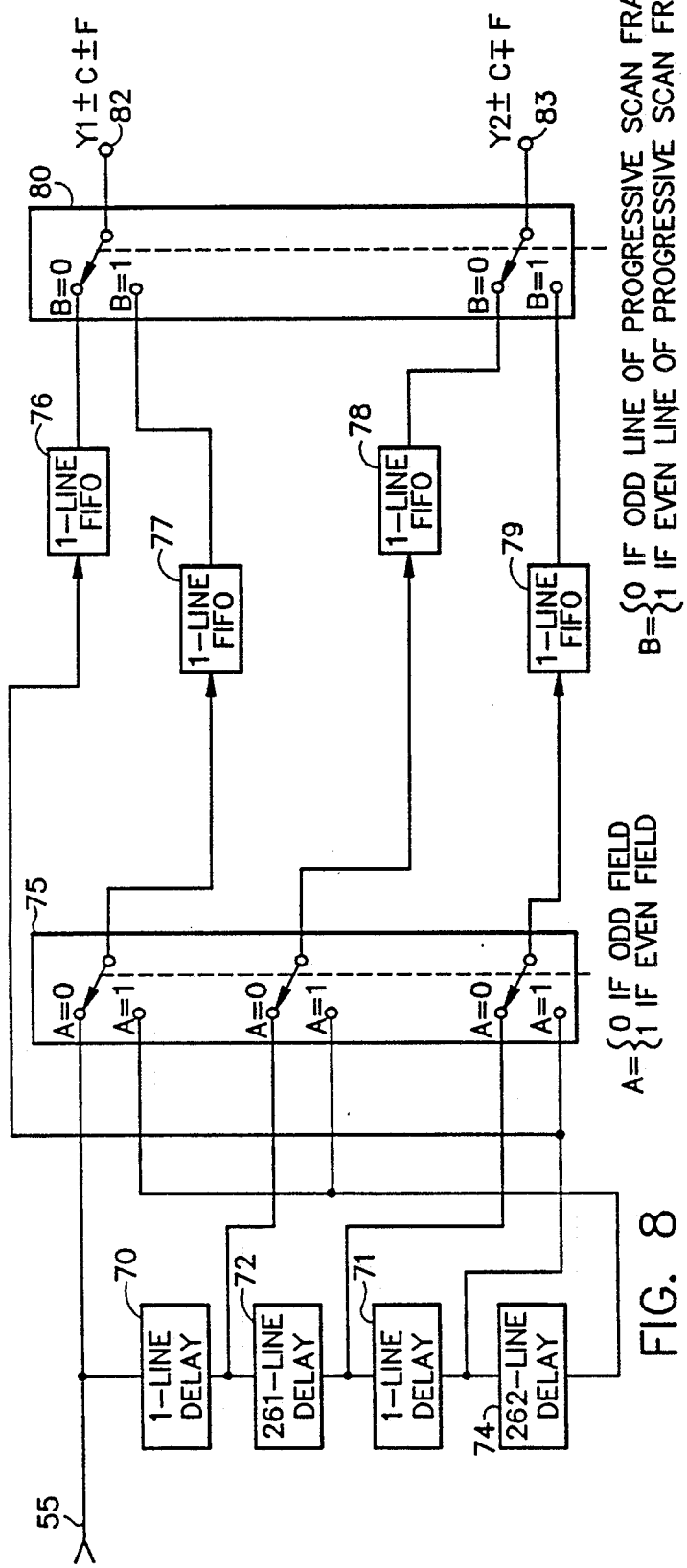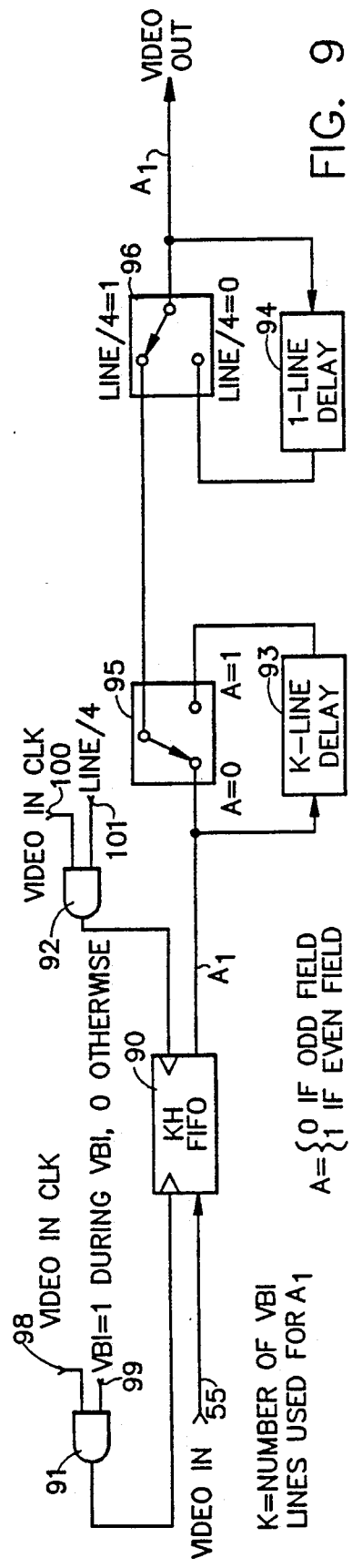

DETERMINATION OF SEQUENTIAL POSITIONS OF VIDEO FIELDS DERIVED FROM FILM

BACKGROUND OF THE INVENTION

The present invention generally pertains to the processing of video signals derived from a film having successive image frames, such as motion picture film, and is particularly directed to determining the sequential position of video fields in the derived video signal.

A large number of video signal sources are derived from commercial motion picture film, which is filmed at twenty-four frames per second. The transfer of imaging information from 24 frame-per-second film to 60 field-per-second video is typically performed using storage tube scanning, flying-spot scanning, or more recently, line scanning with a frame store and digital sequencing. In spite of the difference in film-scanning methods, the frame-rate conversion techniques are the same. In practice, the most common frame-rate conversion scheme for film to video transfers is the 3:2 pulldown method film.

FIG. 1 shows the derivation of interlaced video from film using this method. The images were recorded on the film 10 at the rate of 24 frames per second; and interlaced odd video fields 11 and even video fields 12 were derived from the film 10 at the rate of 60 fields per second.

In the repetitive sequentially varying relationship of the received video fields 11, 12 to the film frames 13 from which they were derived in accordance with the 3:2 pulldown method, ten video fields 11, 12 are derived from the first film frame, the second video field being an even field derived from the first film frame, the third video field being an odd field derived from the first film frame, the fourth video field being an even field derived from the second film frame, the fifth video field being an odd field derived from the first film frame, the sixth video field being an even field derived from the third film frame, the seventh video field being an odd field derived from the third film frame, the eighth video field being an even field derived from the third film frame, the ninth video field being an odd field derived from the fourth film frame, and the tenth video field being an even field derived from the fourth film frame.

Referring to FIG. 1, it is seen that the odd and even video fields in the derived video signal are produced in a predetermined repetitive sequentially varying relationship to the film frames. In processing the derived video signal it often is necessary to know the sequential position of video fields in the derived video signal.

SUMMARY OF THE INVENTION

The present invention provides a system for determining the sequential position of video fields of a received video signal that was derived from a film having successive image frames with the video fields having been produced at a greater rate than the film frame rate and in a predetermined repetitive sequentially varying relationship to the film frames wherein at predetermined positions in the sequence a video field is identical to the video field that preceded it by the duration of a given number of video fields. The system includes means for delaying each field of the received video signal; means for comparing each received video field with a video field that has been delayed by the duration of said given number of video fields; and means for comparing the results of a successive number of said comparisons with the predetermined sequence to determine when identical fields are located in only said predetermined positions in a sequence of the compared received video fields. When, the video signal is derived in accordance with the 3:2 pulldown method, as described above, the first and third video fields produced during each sequence are identical, and the sixth and eighth video fields produced during each sequence are identical. Accordingly, when the present invention is adapted for determining the sequential position of video fields in a video signal produced by the 3:2 pulldown method, each received video field is compared with a video field that has been delayed by the duration of two video fields.

The sequential position determination system of the present invention in particularly useful in a system for providing a progressive-scan video display signal from a received video signal derived from a film having successive image frames by producing odd and even video fields from each film frame, when the video fields have been produced at a greater rate than the film frame rate and in a repetitive sequentially varying relationship to the film frames, such as described in a copending United States Patent Application entitled "Progressive Scan Display of Video Derived From Film", filed on even date herewith by one of the present Inventors, Edward Anthony Krause.

The sequential positioning determination system of the present invention also may used to facilitate other processes that make use of such information, such as but not limited to, processes for estimating motion based on temporal interpolation and encoding.

In a separate aspect, the present invention provides a system for processing a received video signal that was derived from film to indicate the sequential position of video fields in a video signal that was derived from a film having successive image frames, with the video fields having been produced at a greater rate than the film frame rate and in a predetermined repetitive sequentially varying relationship to the film frames wherein at predetermined positions in the sequence a video field is identical to the video field that preceded it by the duration of a given number of video fields, the system includes means for delaying each field of the received video signal; means for comparing each received video field with a video that has been delayed by the duration of the given number of video fields; means for comparing the results of a successive number of said comparisons with the predetermined sequence to determine when identical fields are located in only said predetermined positions in a sequence of the compared received video fields; and means synchronized by said determination that identical fields are located in only said predetermined positions in a sequence of the compared received video fields, for inserting indications of sequential video field position in the vertical blanking intervals preceding video fields that are received subsequent to said synchronizing determination.

The insertion of an indication of the sequential video field position in a recorded video program makes it possible to distribute the program to receivers that are equipped merely with means that process the received video program upon detecting such sequential field position indication, thereby obviating the need for the receiver to include the more complex sequential field position determination system described above.

In another aspect of the present invention a system is provided for determining whether a received video signal having video fields are derived from a film having successive image frames, with the video fields having been produced at a greater rate than the film frame rate and in a predetermined repetitive sequentially varying relationship to the film frames wherein at predetermined positions in the sequence a video field is identical to the video field that preceded it by the duration of a given number of video fields. This system includes means for delaying each field of the received video signal; means for comparing each received video field with a video field that has been delayed by the duration of said given number of video fields; means for comparing the results of a successive number of said comparisons with the predetermined sequence to determine if identical fields are located in only said predetermined positions in a sequence of the compared received video fields; and means for timing said comparisons of said compared results with the predetermined sequence and for providing an indication that the received video fields were not so derived from film when a determination that identical fields are located in only said predetermined positions in a sequence of the compared received video fields, is not made within a predetermined time.

In still another aspect, the present invention provides a system for providing a progressive-scan video display signal from a received video signal that may or may not have been derived from film. This system includes means for determining whether the received video signal was derived from a film having successive image frames by producing odd and even video fields from each film frame, with the video fields being produced at a greater rate than the film frame rate and in a repetitive sequentially varying relationship to the film frames; means for delaying each field of the received video signal; means responsive to a determination that the received video signal was so derived from film, for combining the received and delayed video fields to provide a progressive-scan video frame signal at the video field rate, in which alternate lines are derived respectively from odd and even video fields; and means responsive to a determination that the received video signal was not so derived from film, for combining the predetermined portions of the received signal to provide a progressive-scan video frame signal at the video field rate. This system may conveniently use the system described above for determining whether the received video signal was derived from a film having successive image frames by producing odd and even video fields from each film frame, with the video fields being produced at a greater rate than the film frame rate and in a repetitive sequentially varying relationship to the film frames.

Additional features of the present invention are described in relation to the description of the preferred embodiments.

DESCRIPTION OF THE PREFERRED EMBODIMENTS

Figure 1:
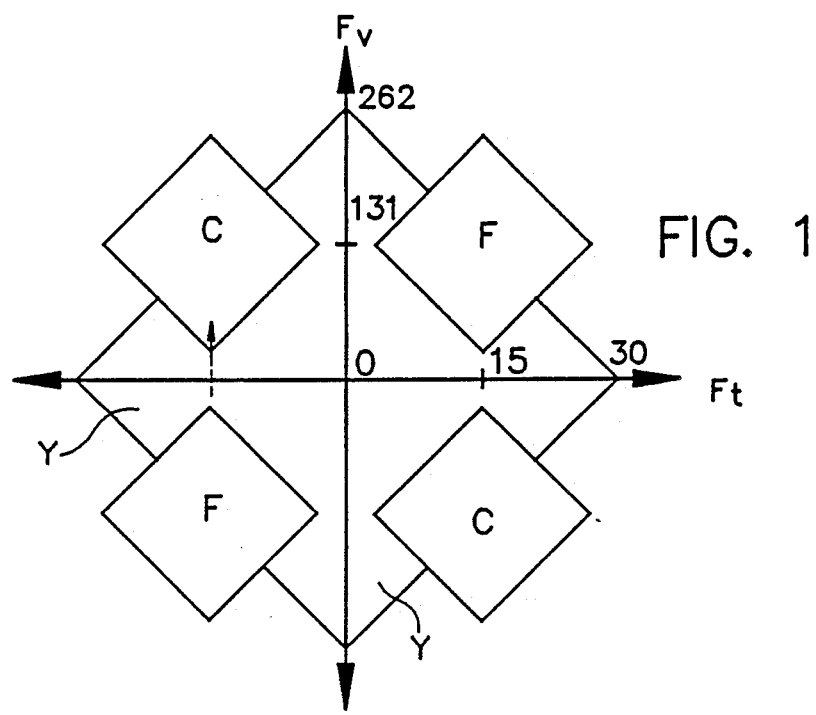
FIG. 1 is a diagram illustrating the relationship between the received video fields and the film frames from which the video fields were derived from film when the video fields were derived in accordance with the 3:2 pulldown method.
Figure 2:
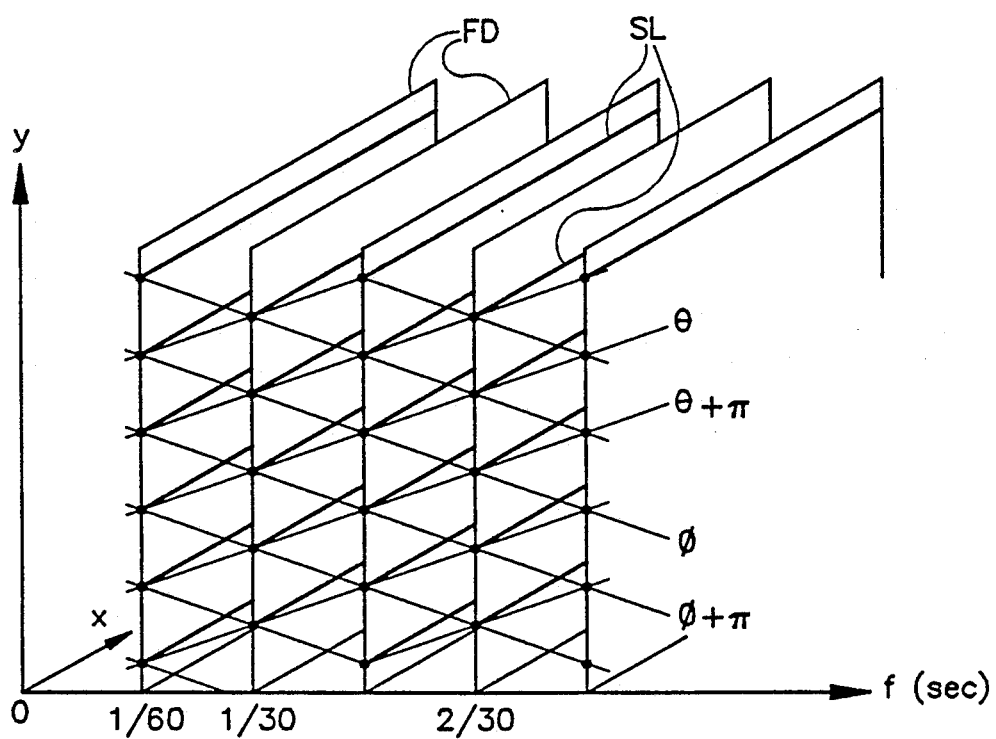
FIG. 2 is a diagram showing a preferred embodiment of the sequential position determination system of the present invention included in a system for generating a progressive-scan display video signal.

Referring to FIG. 2, in a preferred embodiment of the present invention, the sequential field position is determined by a film sync detection circuit 20, which is included in a system for producing a progressive-scan video display signal at video output terminal 18. The film sync detection circuit 20 includes a first one-field delay unit 21, a second one-field delay unit 22, a field comparator 23, an n-bit shift register 24, and a first AND gate 25, which are interconnected as shown in FIG. 2. Each of the one-field delay units 21, 22 delays the received video signal by 262 horizontal lines. There is a one-line delay unit 26 connected between the one-field delay units 21, 22.

The film sync detection circuit 20 further determines whether or not the video signal received at a video input terminal 27 was derived from film in accordance with the 3:2 pulldown method includes the sequential position detection system 20. To accomplish this additional function, the film sync detection circuit 20 further includes a first counter 29 a second AND gate 30 and a third AND gate 31, which are interconnected as shown in FIG. 2.

The progressive-scan video display system of FIG. 2 further includes a control circuit 35, a switching circuit 36, an averaging device 37, a first one-line FIFO stack 38 and a second one-line FIFO stack 39, which are interconnected as shown in FIG. 2.

The control circuit 35 includes a switch control logic circuit 41, a flip-flop 42, a second counter 43, a fourth AND gate 44, a fifth AND gate 45, a sixth AND gate 46, a seventh AND gate 47, a first OR gate 48, a second OR gate 49 and an inventor 50, which are interconnected as shown in FIG. 2.

The switching circuit 36 includes a first switch 52 and a second switch 53. The operation of the switching circuit is controlled by control signals provided on lines 55 by the switch control logic circuit 41. The respective switch positions are determined by the different combinations of the states of the signals received by the switch control logic circuit 41 at input terminals a, b and c from the counter 43 and at input terminal d from the AND gate 31 of the system for determining whether or not the video signal received at a video input terminal 27 was derived from film in accordance with the 3:2 pulldown method; and are indicated by Boolian expressions set forth in FIG. 2 adjacent the respective switch terminals that are connected when the condition set forth in such expression applies.

Figure 3:
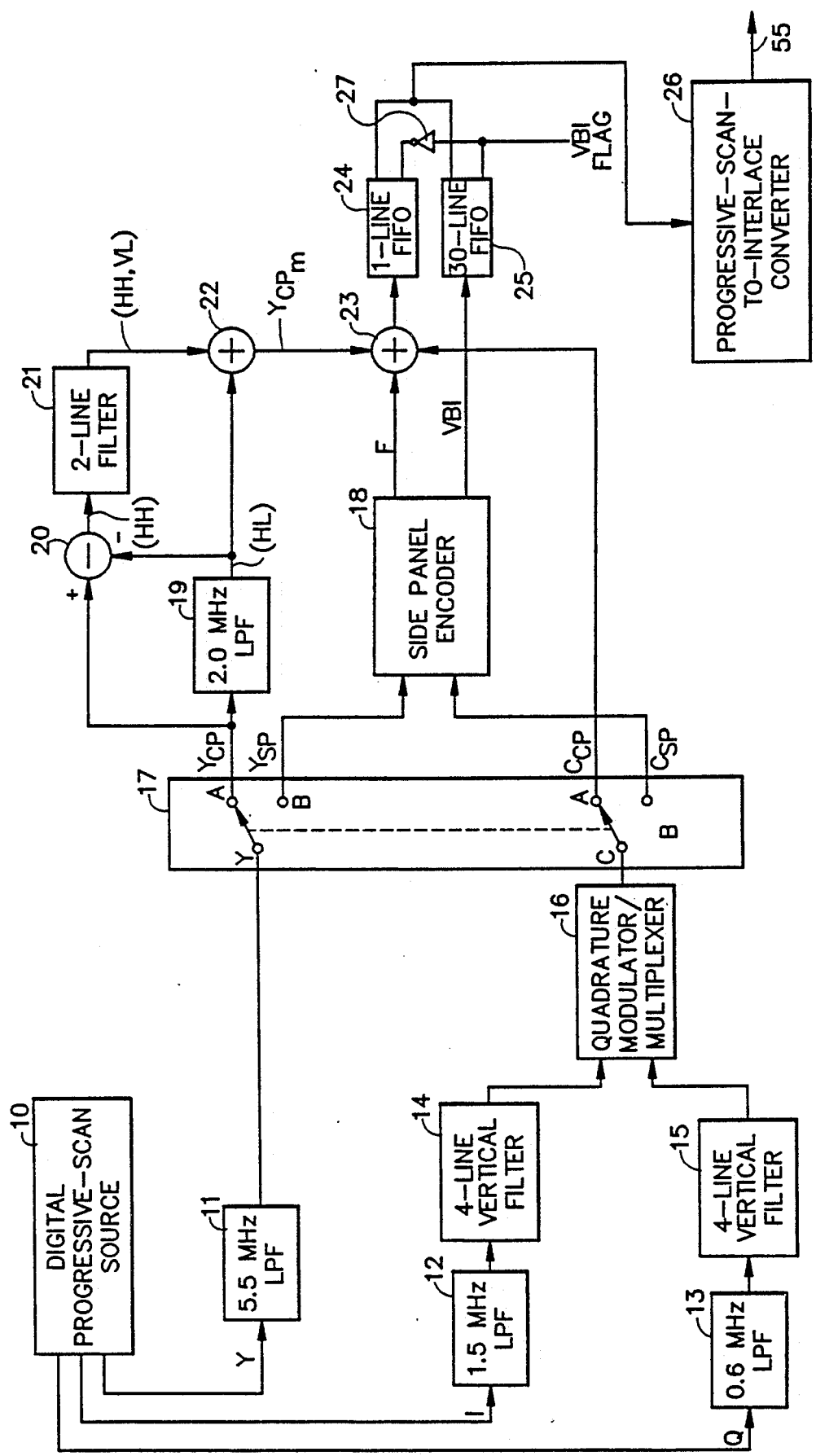
FIG. 3 is a diagram of the field comparator in the system of FIG. 2.

FIG. 3 illustrates the preferred embodiment of the field comparator 23 in the system of FIG. 2. The field comparator includes an arithmetic processor 57, first, second, third and fourth threshold detectors 58, 59, 60, 61, first, second, third and fourth counters 62, 63, 64, 65 and an OR gate 66. Each of the four counters is cleared by the trailing edge of each vertical sync pulse on line 68. The relationship of the thresholds respectively applied to the four threshold detectors, as shown in FIG. 3, is: <TH1 <TH2<TH3<TH4.

The field comparison performed by the combination of the arithmetic processor 57, the threshold detectors 58, 59, 60 61 and the counters 62, 63, 64, 65 is a global comparison for the entirety of each compared field. Each field is divided into pixels or groups of pixels to provide a plurality of 8-bit digital samples for each field comparison. The field comparator also includes a local comparator 70 that performs a quicker comparison for a predetermined corresponding portion of the respective fields that are being compared.

Figure 4:
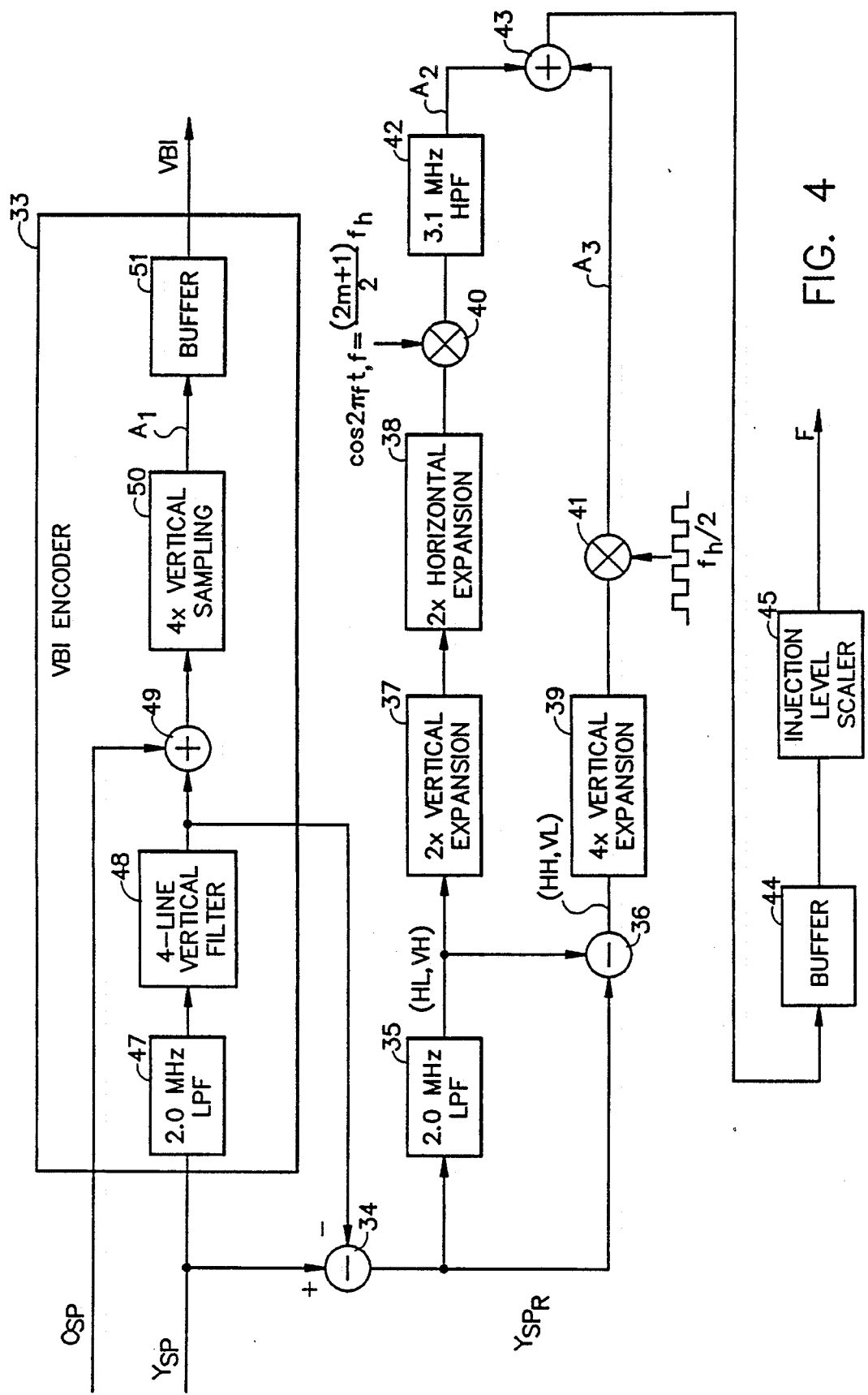
FIG. 4 is a timing diagram for the system of FIG. 2 during a period when there is a transition of the input video signal from a signal not derived from film in accordance with the 3:2 pulldown method to a signal that was so derived.
Figure 4A:
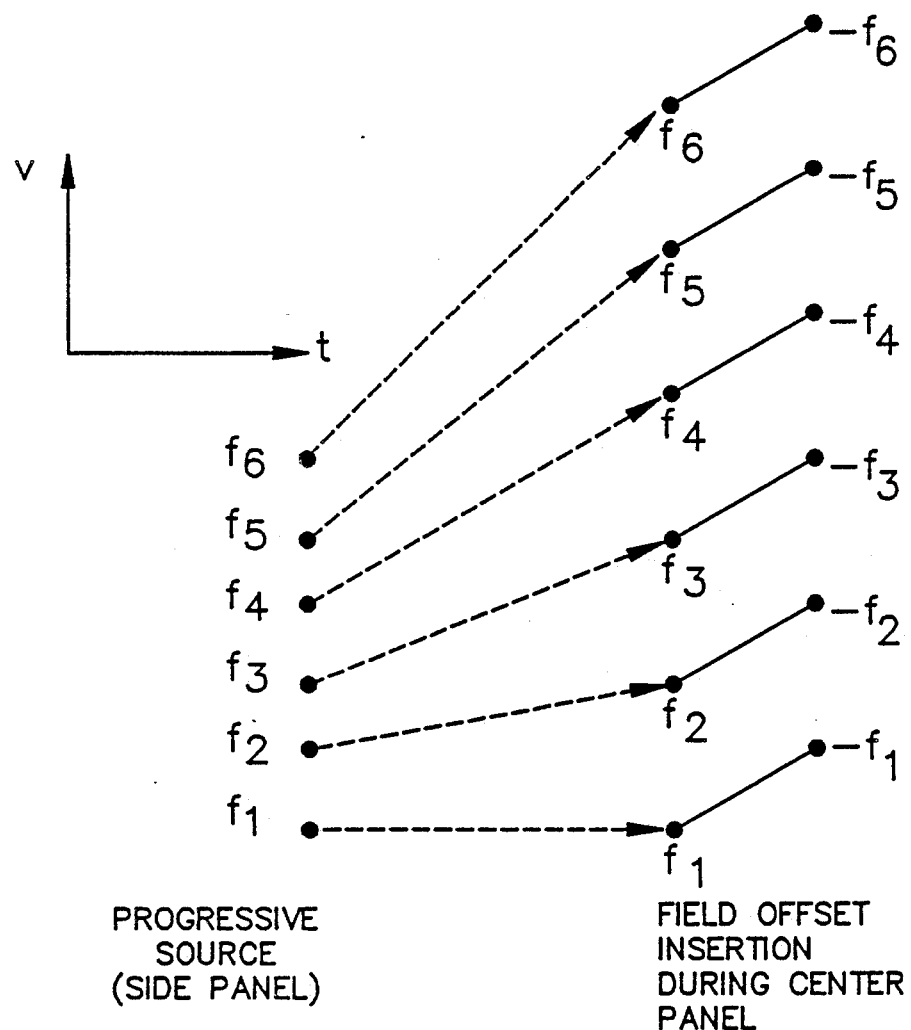
Figure 5A:
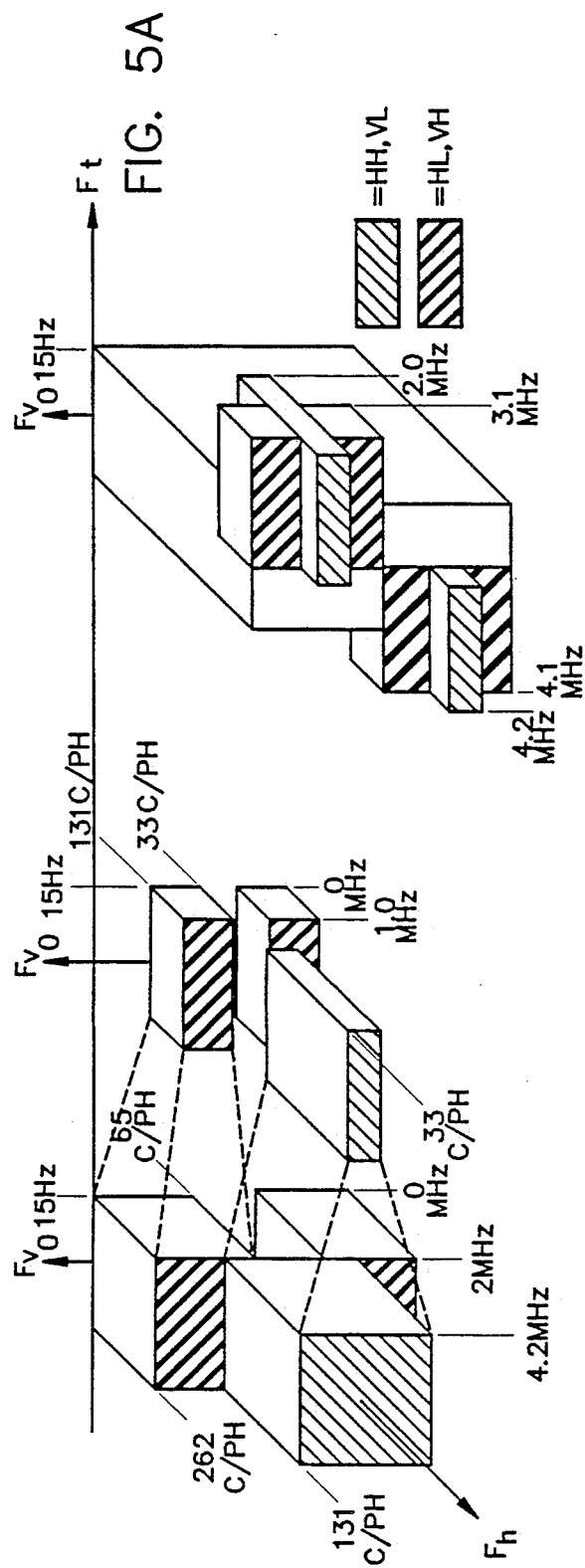
FIG. 5 is a timing diagram for the system of FIG. 2 during a period when there is a transition of the input video signal from a signal derived from film in accordance with the 3:2 pulldown method to a signal that was not so derived, such as typical broadcast video signal.
Figure 5B:
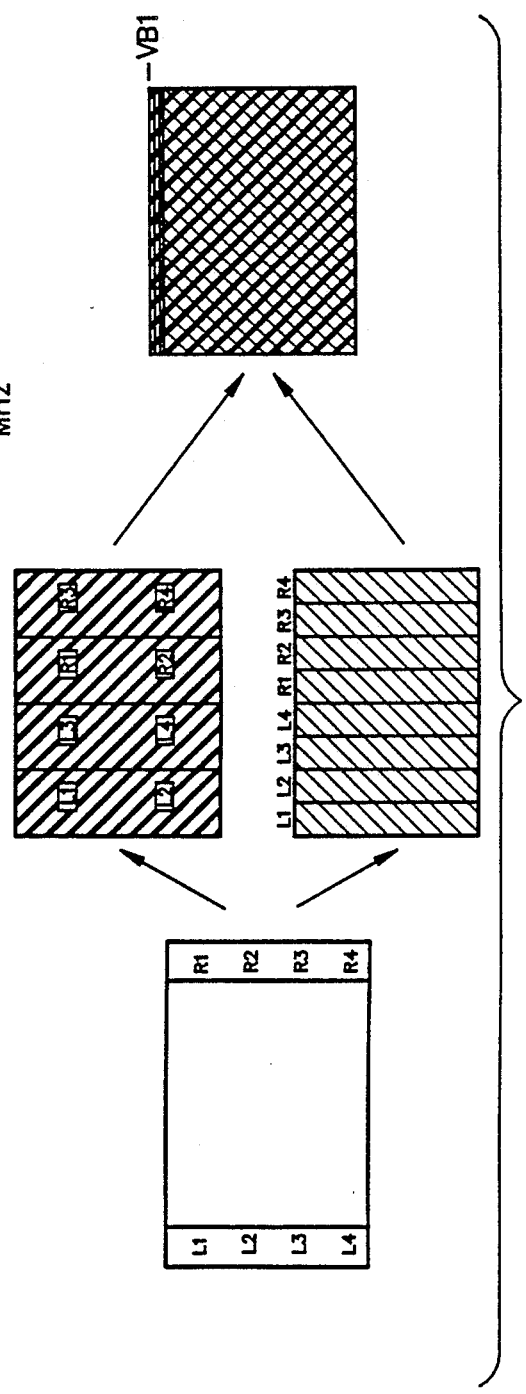
Figure 6B:
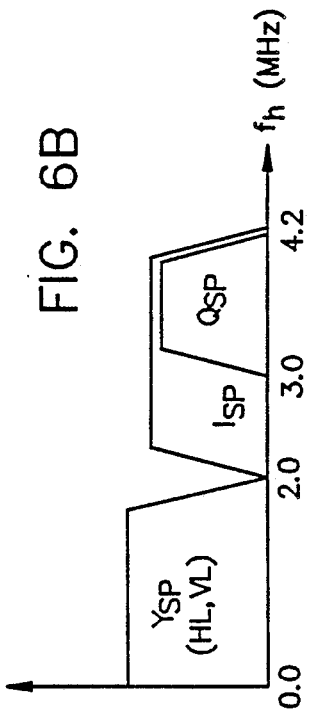
FIG. 6 is a timing diagram for enabling outputs from the one-line FIFO stacks in the system of FIG. 2.
Figure 6A:
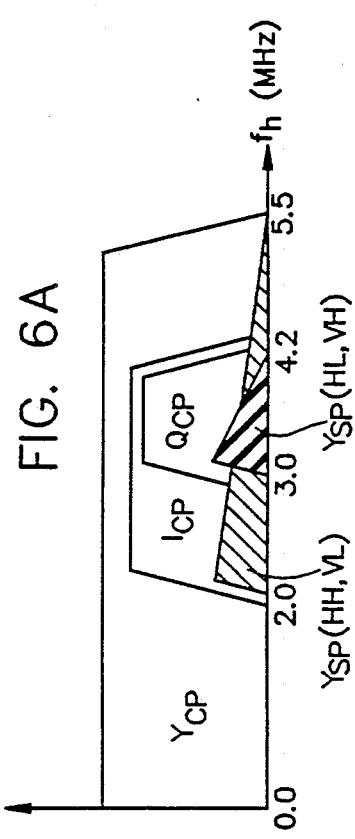
Figure 5:
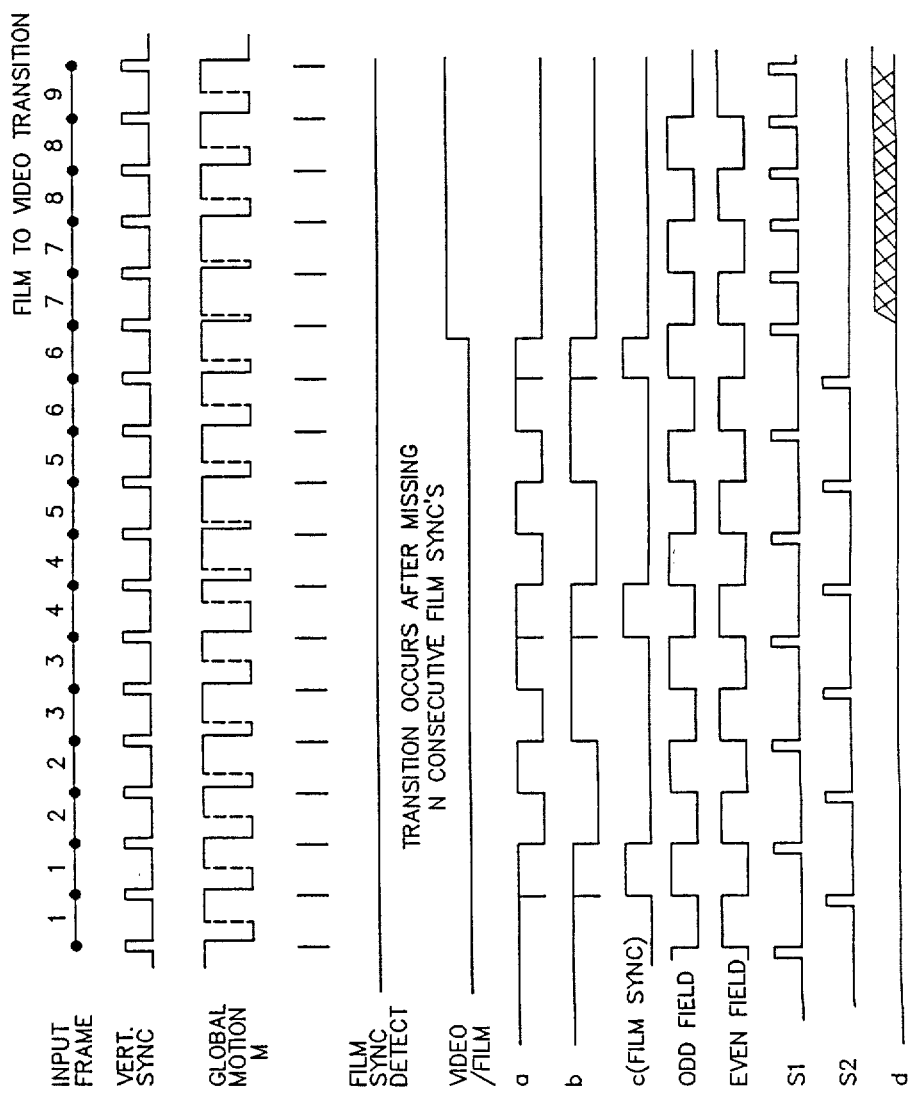
Figure 6:
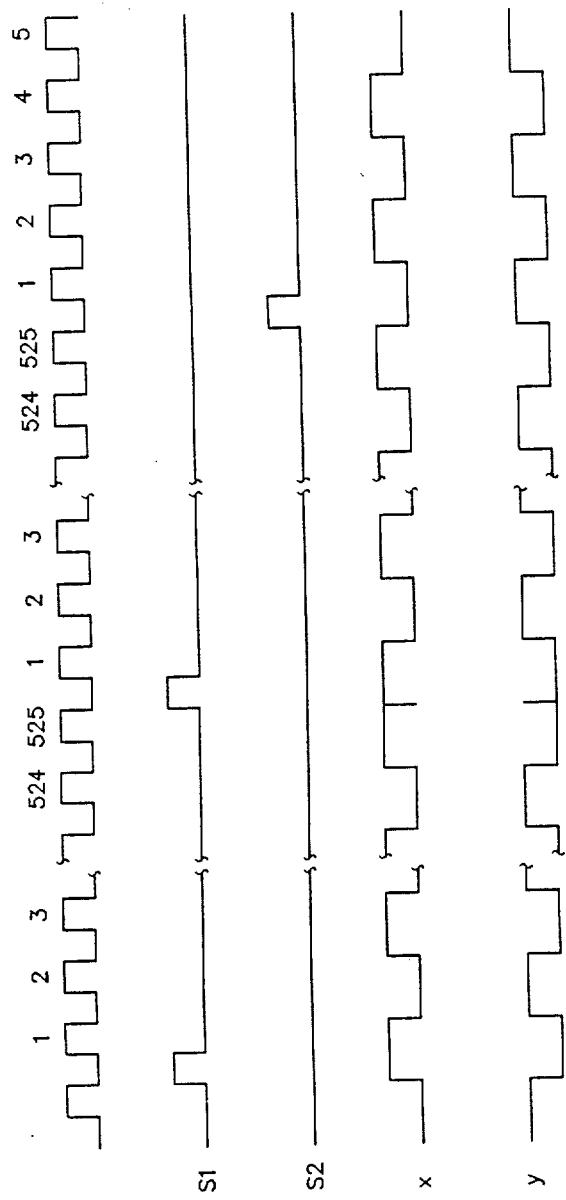
Figure 7:
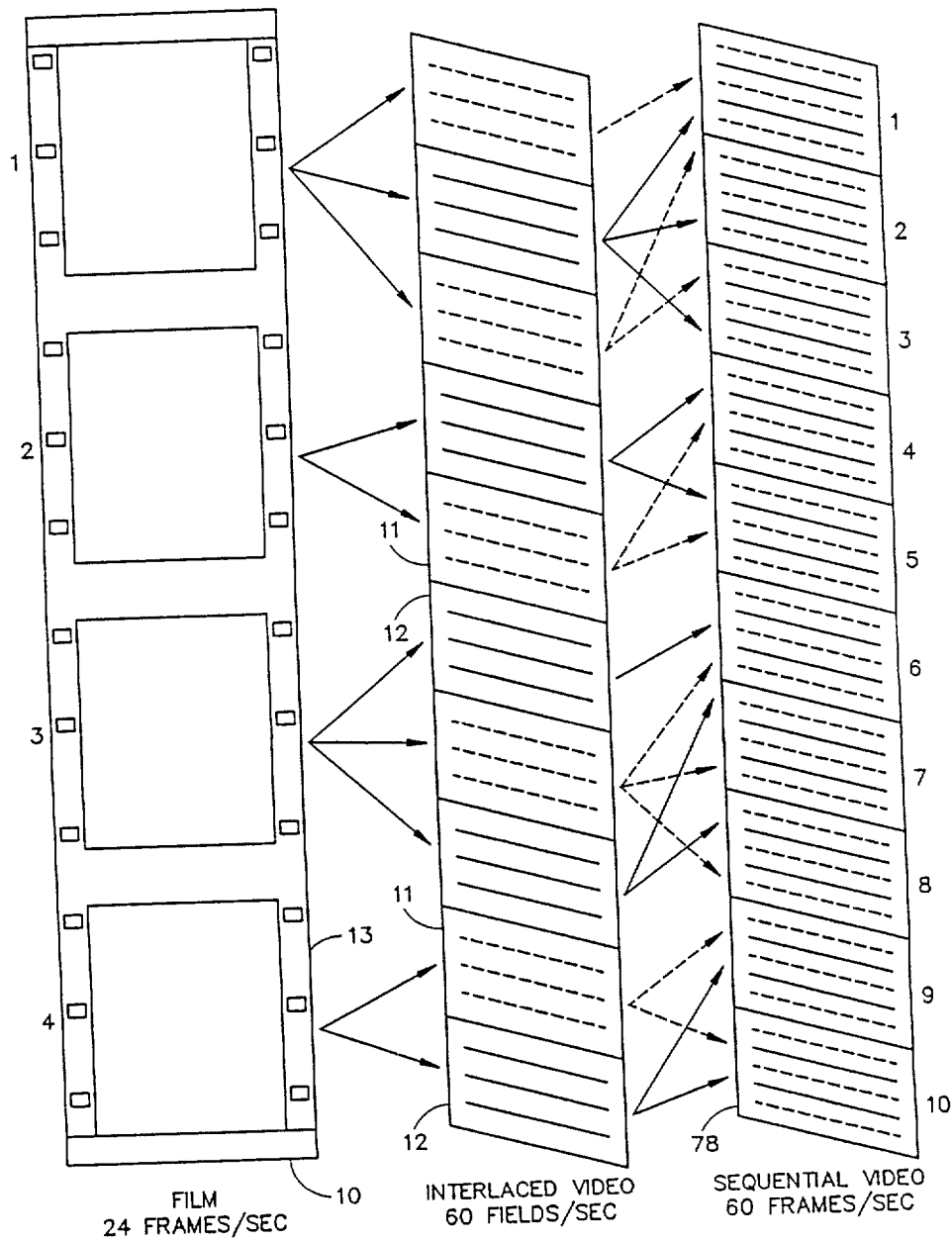

The operation of the systems of FIGS. 2 and 3 may be readily understood by referring to the timing diagrams of FIGS. 4, 5 and 6. The vertical sync signal on line 68, are all derived from the interlaced video signal received at the video input terminal 27 by a conventional video sync stripper and timing circuit (not shown).

Figure 7:
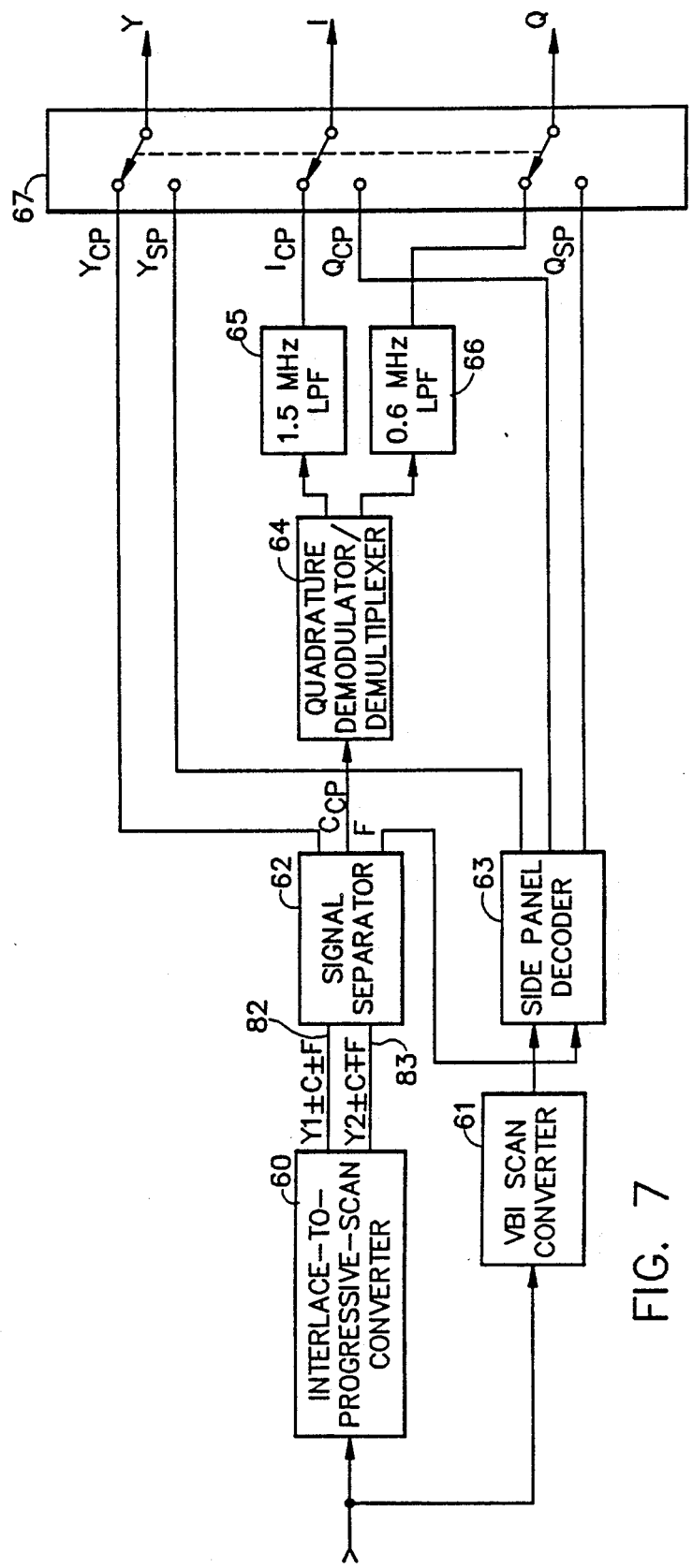
FIG. 7 is a diagram illustrating the relationship between the received video fields and the film frames which the video fields were derived from film when the video fields were derived in accordance with the 3:2 pulldown method and the frames of a progressive-scan video signal produced by processing the derived video fields in accordance with one mode of operation of the system of FIG. 2.

FIG. 7 illustrates the relationship between the frames of the progressive-scan video signal, the received video fields and the film frames from which the video fields were derived from film when the video fields were derived in accordance with the 3:2 pulldown method. The images were recorded on the film 10 at the rate of 24 frames per second; and interlaced odd video fields 11 and even video fields 12 were derived from the film 10 at the rate of 60 fields per second.

In the repetitive sequentially varying relatioship of the received video fields 11, 12 to the film frames 13 from which they were derived in accordance with the 3:2 pulldown method, ten video fields 11, 12 are derived from every four film frames 13 with the first video field being an odd field derived from the first film frame, the second video field being an even field derived from the first film frame, the third video field being an odd field derived from the first film frame, the fourth video field being an even field derived from the second film frame, the fifth video field being an off field derived from the first film frame, the six video field being an even field derived from the third film frame, the seventh video field being an odd field derived from the third film frame, the eighth video field being an even field derived from the third film frame, the ninth video field being an odd field derived from the fourth film frame, and the tenth video field being an even field derived from the fourth film frame.

When the VIDEO/$\overline{\text{FILM}}$ signal on line 76 from the Q output of the counter 29 indicates that the received video fields 11, 12 were derived in accordance with the 3:2 pulldown method, the switch control logic circuit 41 provides switch position control signals on lines 55 that cause the switching circuit 36, the first and second one-field delay devices 21, 22, and the first and second one-line FIFO stacks 38, 39 to vary the combinations of the alternating odd and even video fields received at the video input terminal 27 and delayed by the first and second one-field delay devices 21, 22 in such a manner as to provide a progressive scan video frame signal at output terminal 18 by progressively interlacing the first video field with the second video field to provide a first video frame, by progressively interlacing the third video field with the second video field to provide sequentially second and third video frames, by progressively interlacing the fourth video field with the fifth video field to provide sequentially fourth anf fifth video frames, by progressively interlacing the sixth video field with the seventh video field to provide a sixth video frame, by progressively interlacing the seventh video field with the eighth video field to provide sequentially seventh and eighth video frames, and by progressively interlacing the ninth video field with the tenth video field to provide sequentially ninth and tenth video frames. The progressive-scan video frames 78 are provided at the output terminal 18 at the rate of 60 frames per second.

Figure 8:
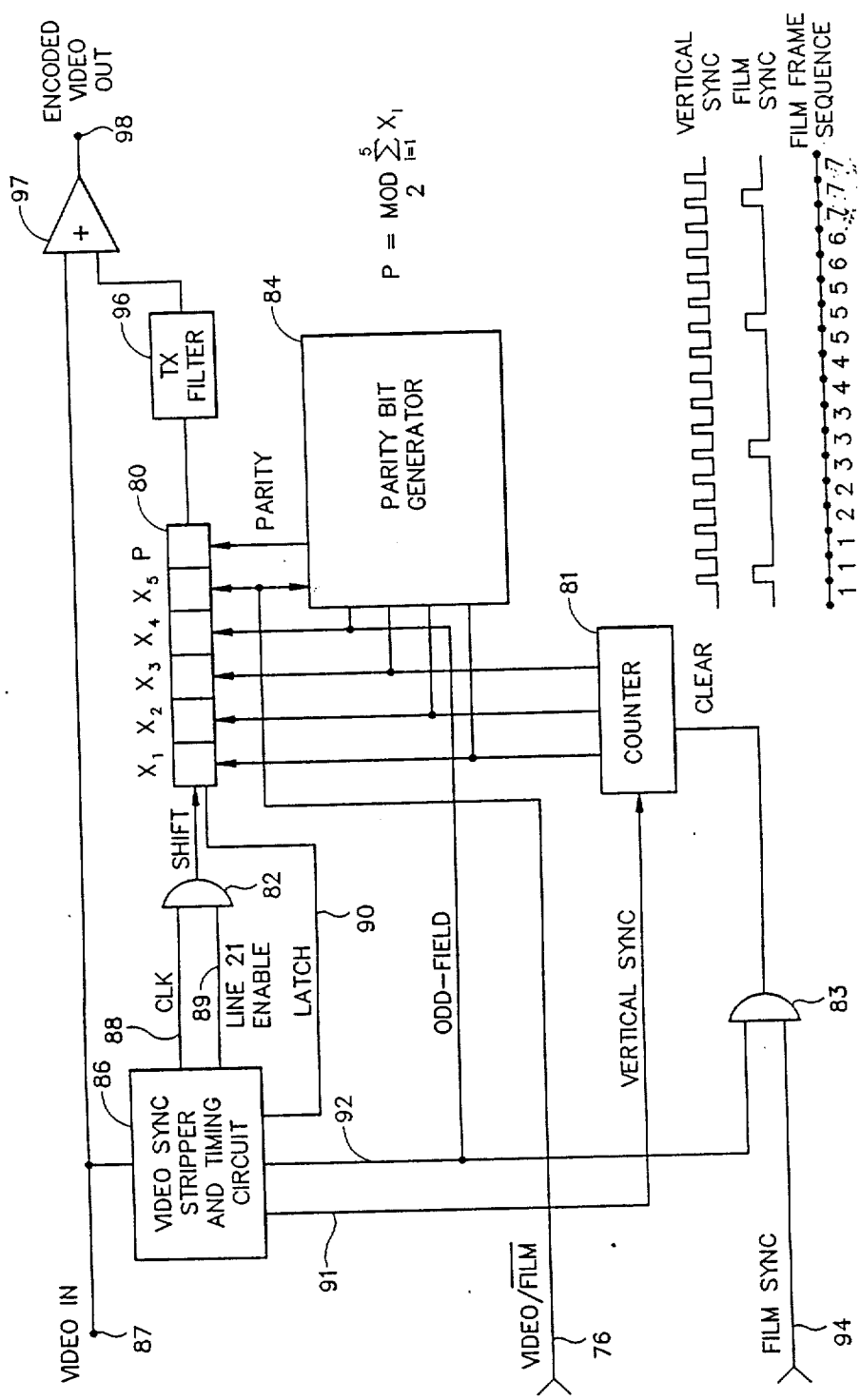
FIG. 8 is a diagram of a system according to a preferred embodiment of one aspect of the present invention for inserting sequential field position indications in a video signal derived from film.

Referring to FIG. 8, a preferred embodiment of a system according to the present invention for inserting sequential position indications in a video signal derived from film in accordance with the 3:2 pulldown method includes a shift register 80, a counter 81, a first AND gate 82, a second AND gate 83 and a parity bit generator 84, which are interconneted as shown in FIG. 8. A conventional video sync stripper and timing circuit 86 derives the following signals from the video signal (provided at terminal 87), into which the sequential position indications are to be inserted: a clock signal on line 88 to the AND gate 82, an enable signal provided on line 89 during horizontal line 21 to the AND gate 82, a latch signal provided on line 90 to the shift register 80, a vertical sync signal on line 91 to the clock input of the counter 81, and an odd-field indication signal provided on line 92 to the AND gate 83. A VIDEO/$\overline{\text{FILM}}$ signal is provided on line 76 from the Q output of the counter 29 in the system of FIG. 2; and a FILM SYNC DETECT signal is provided on line 94 from the output of the AND gates 25 in the system of FIG. 2. The expression for the parity bit P is shown in FIG. 8, as are timing diagrams for the vertical sync signal on line 91, the FILM SYNC DETECT signal on line 94 and the film frame sequence.

During line 21 of each video field, the output of the shift register 80 is provided via a transmission filter 96 to an insertion device 97 and inserted into the vertical blanking interval of the video signal received at terminal 87 to provide a video signal at output terminal 98 that has been encoded with an indication of the sequential position of the video field.

Figure 9:
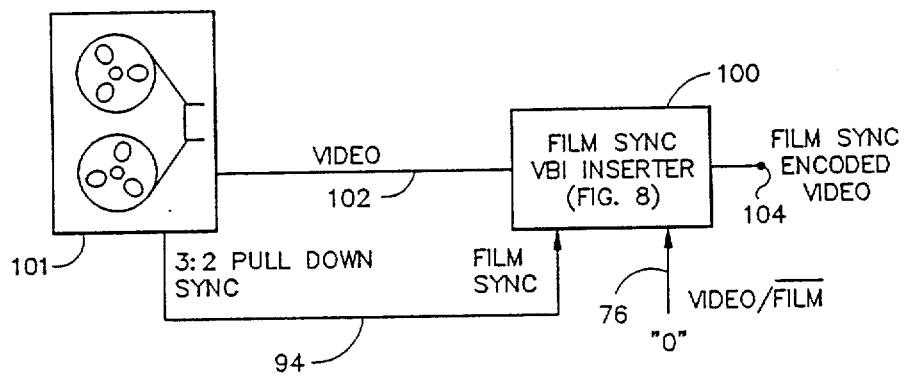
FIG. 9 is a diagram showing the insertion system of FIG. 8 included in a telecinic-film-to-video-transfer machine.
Figure 10:
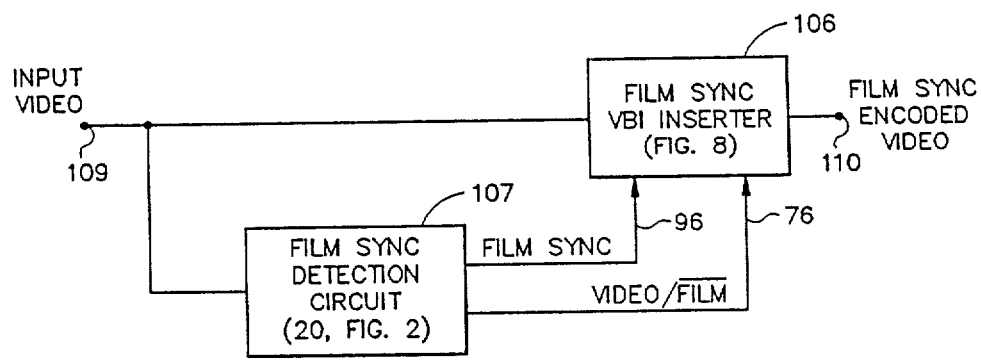
Figure 11:
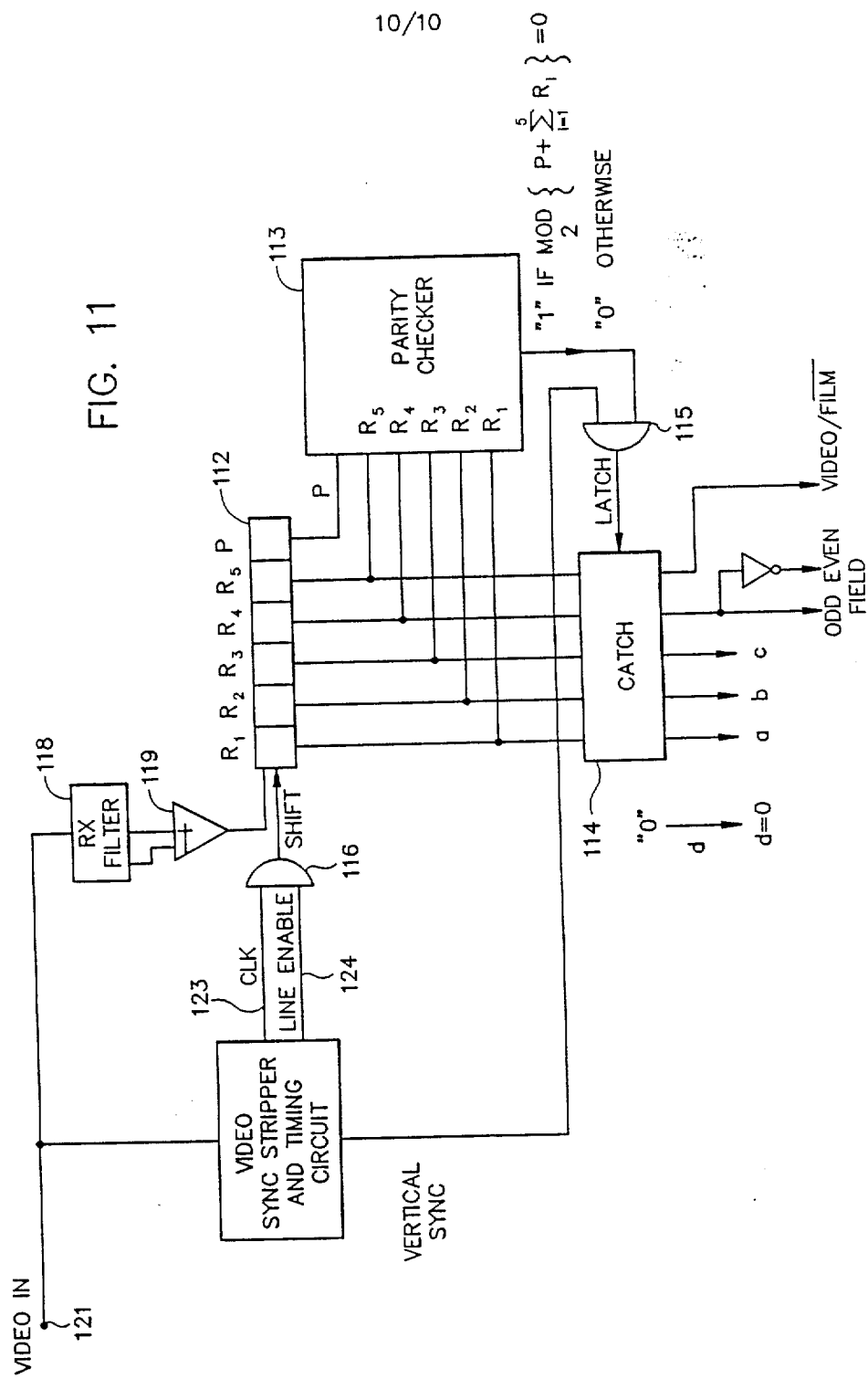

Referring to FIG. 9 a system for inserting sequential field position indications in a video signal at the time the video signal is derived from film includes a film sync VBI insertion system 100, (which corresponds to the insertion system shown in FIG. 8), and a telecinic-to-video transfer machine 101. The machine 101 derives a video signal 102 from film by the 3:2 pulldown method, and provides a sync signal on line 94 indicating the beginning of each repetitive sequence of video frames. This signal is provided to the FILM SYNC input line 94 of the insertion system 100 (FIG. 8). A "0" state signal indicating that the video signal is being derived from film is provided on the VIDEO/$\overline{\text{FILM}}$ input line of the insertion system 100 (FIG. 8). The insertion system 100 inserts the sequential field positions indications in the vertical blanking interval preceding each video field of the derived video signal on line 102 to provide a film sync encoded video signal at video output terminal 104.

Figure 10:
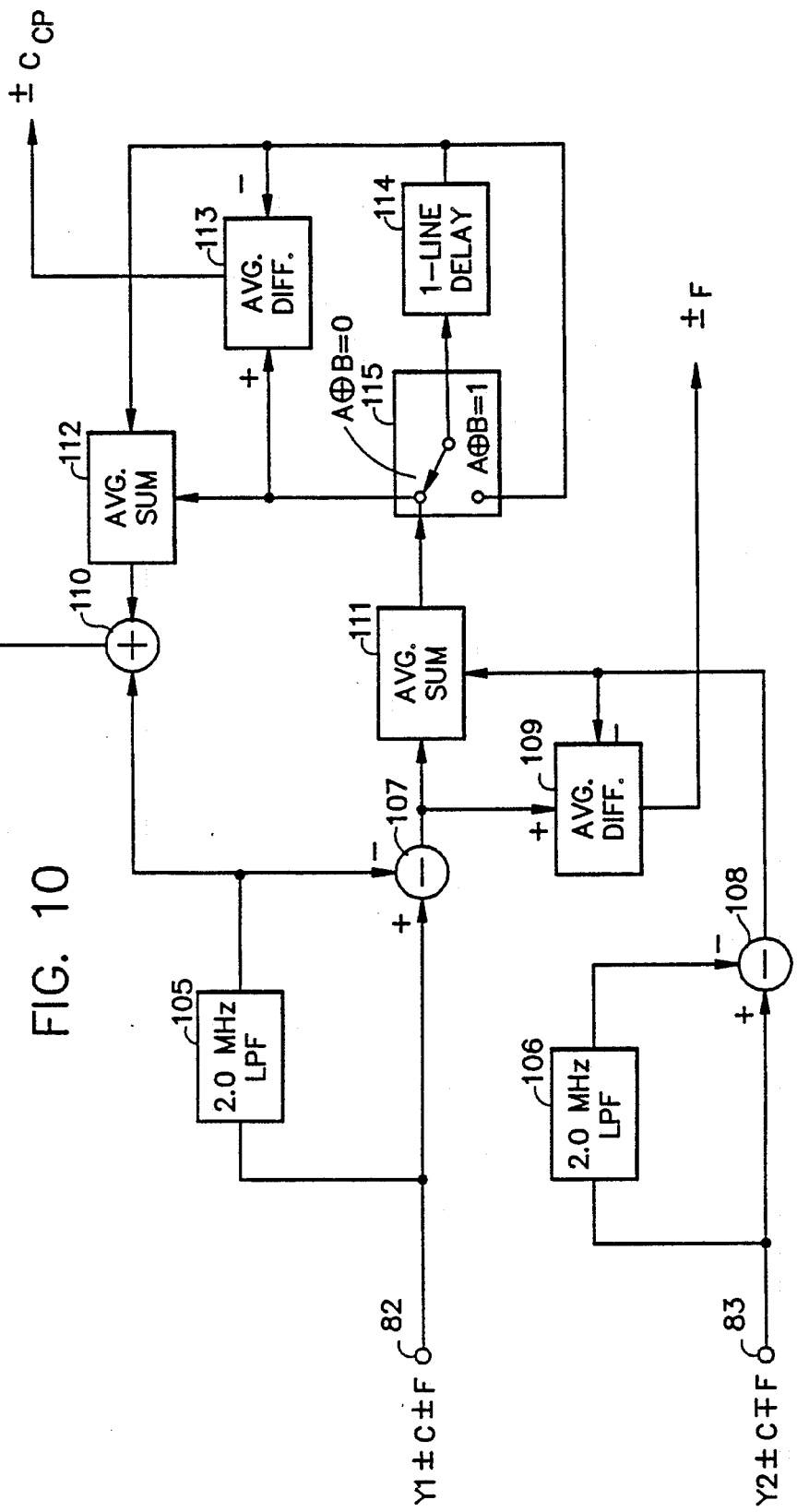
FIG. 10 is a diagram showing the insertion system of FIG. 8 included in a system for inserting sequential field position indications in preexisting video signals.

Referring to FIG. 10, a system for inserting sequential field position indications in a video signal that previously was derived from film by the 3:2 pulldown method includes a film sync VBI insertion system 106, (which corresponds to the insertion system shown in FIG. 8), and a film sync detection circuit 107 (which corresponds to the film sync detection circuit 20 in the system of FIG. 2). The film sync detection circuit 107 determines the sequential position of video fields in a video signal received at video input terminal 109 and further determines whether the video signal at input terminal 109 was derived from film by the 3:2 pulldown method). The film sync detection circuit 107 provides a FILM SYNC signal on line 94 corresponding to the FILM SYNC signal provided on line 94 by the film sync detection circuit 20 in the system of FIG. 2, and further provides a VIDEO/$\overline{\text{FILM}}$ signal on line 76 corresponding to the VIDEO/$\overline{\text{FILM}}$ signal provided on line 76 by the film sync detection circuit 20 in the system of FIG. 2. The insertion system 106 inserts the sequential field positions indications in the vertical blanking interval preceding each video field of a film-derived video signal received at video input terminal 109 to provide a film sync encoded video signal at video output terminal 110.

Figure 11:
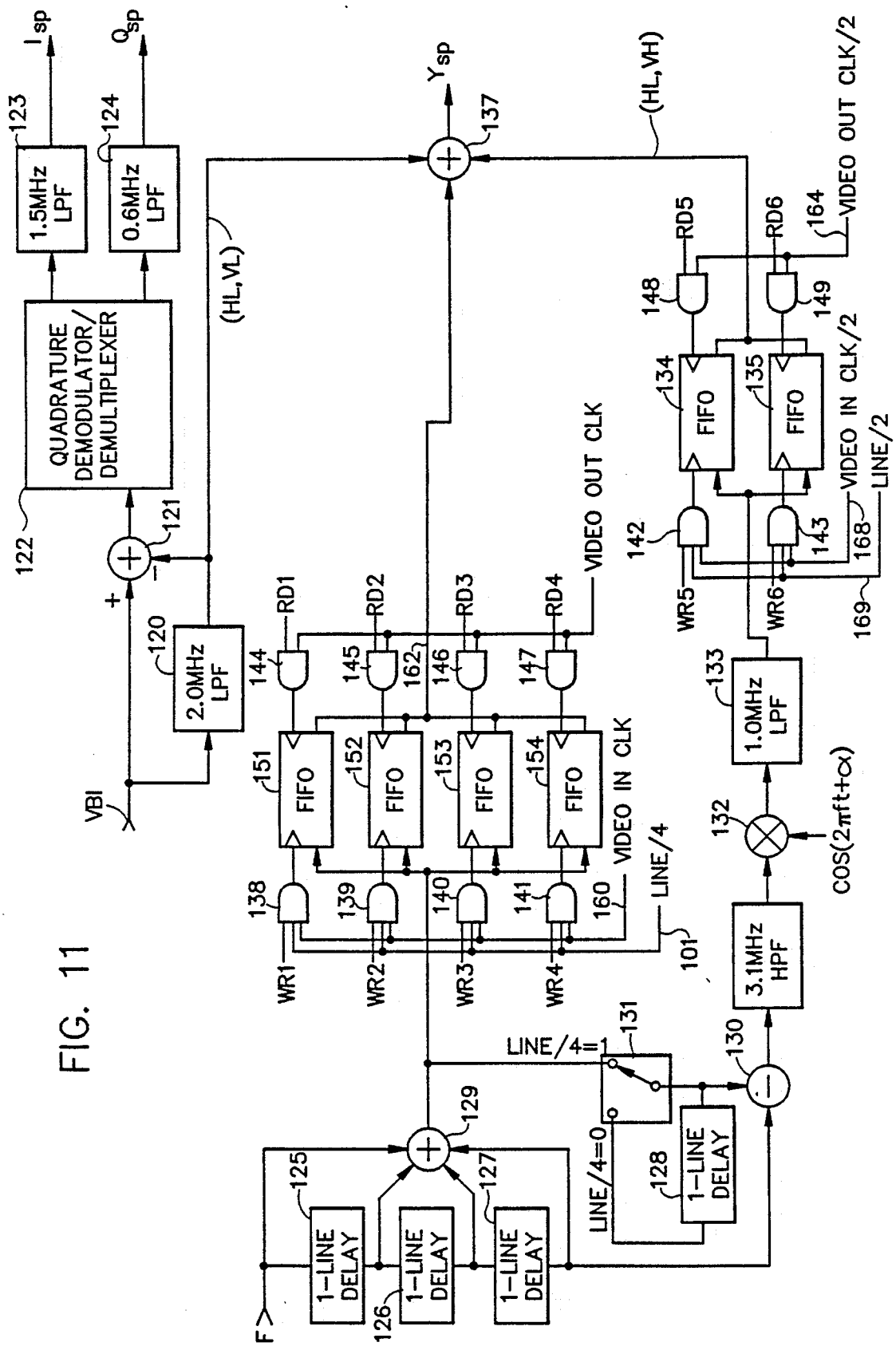
FIG. 11 is a diagram showing a system that is included in receivers and editor machines for detecting sequential field position indications inserted in the veritcal blanking interval of a video signal derived from film by the systems of FIGS. 8, 9 and 10.
Figure 12:
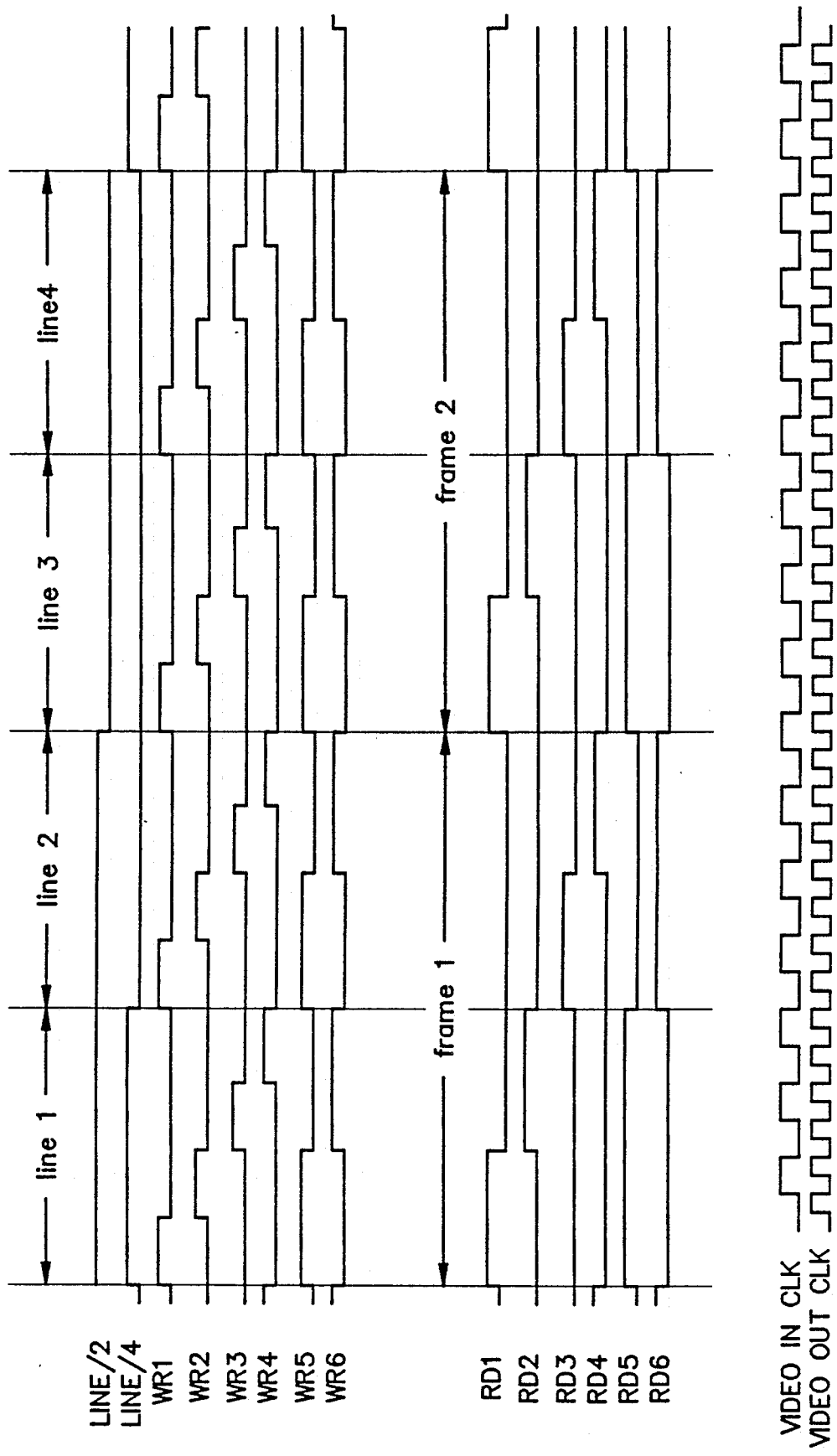
Figure 13:
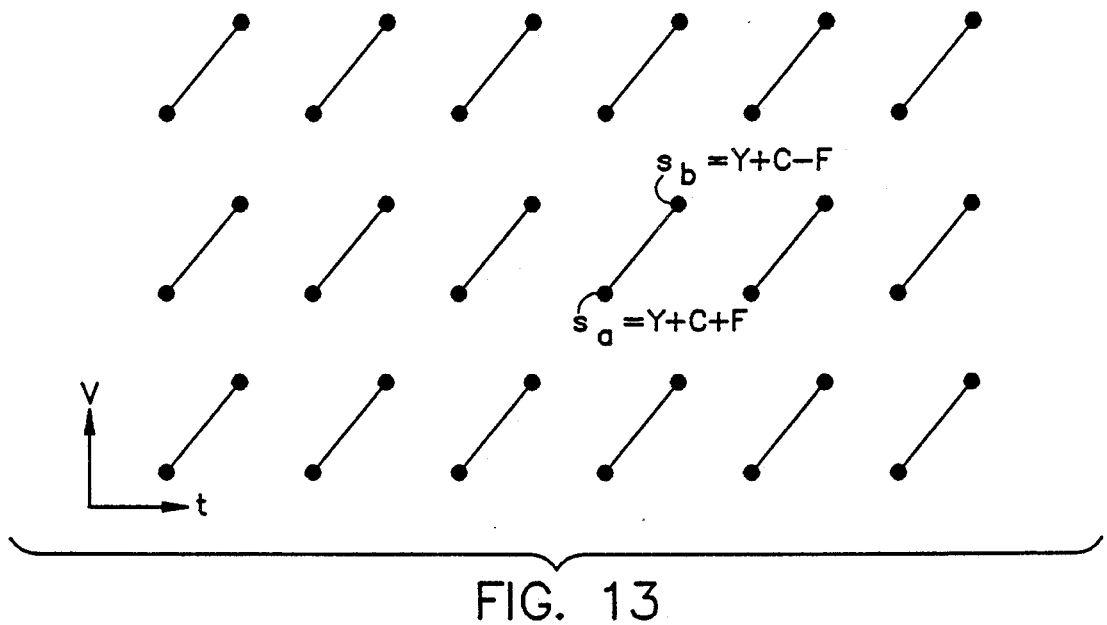
Figure 14:
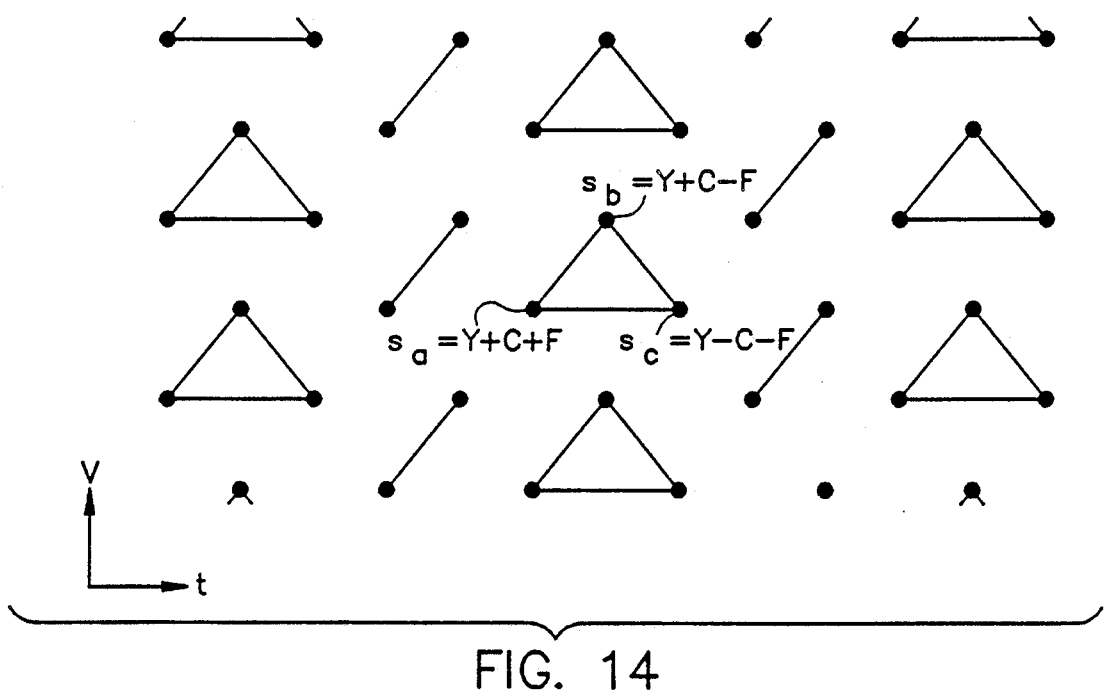
Figure 2:
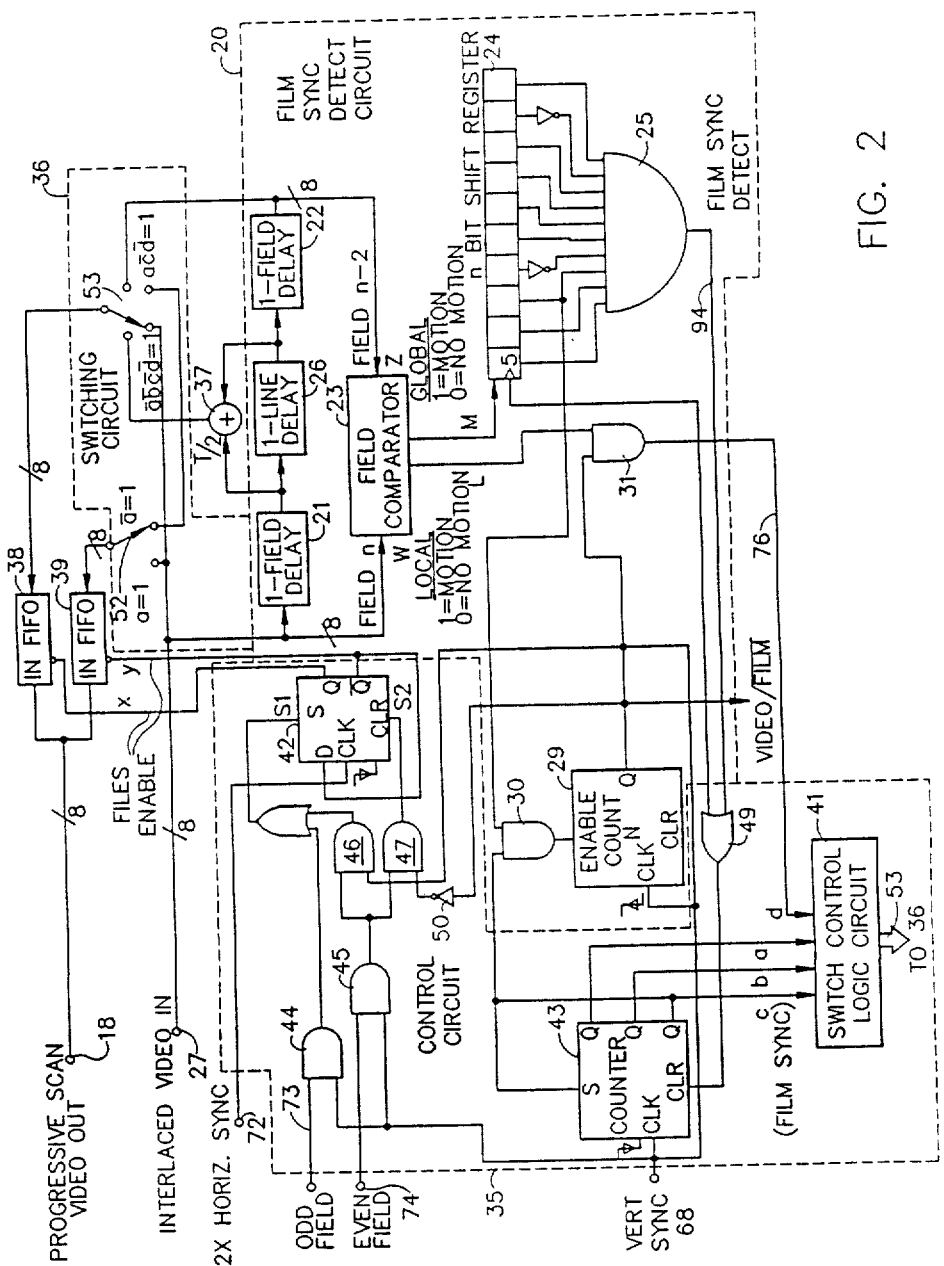
Figure 3:
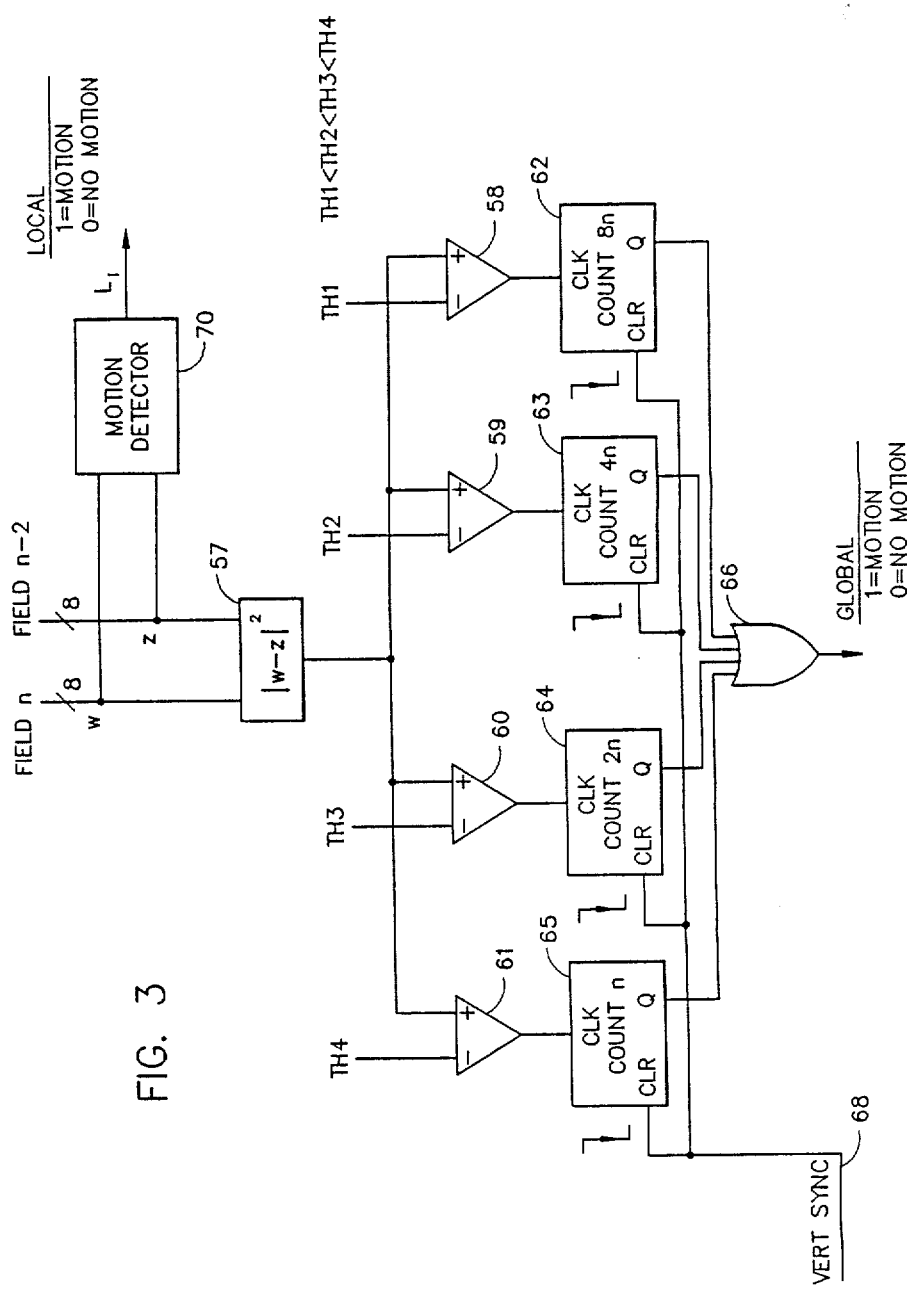

Referring to FIG. 11, a system that is included in receivers and editor machines for detecting sequential field position indications inserted in the vertical blanking interval of a video signal derived from film by the systems of FIGS. 8, 9 and 10, includes a shift register 112, a parity checker 113, a latch 114, a first AND gate 115, a second AND gate 116, a video sync stripper and timing circuit 117, a receiver filter 118 and a threshold detector 119, which are interconnected as shown in FIG. 11. The parity detection expression for the parity checker 113 is shown in FIG. 11.

A conventional video sync stripper and timing circuit 117 derives the following signals from the received video signal (provided at terminal 121), a clock signal on line 123 to the AND gate 116, an enable signal provided on line 124 during horizontal line 21 to the AND gate 116, and a vertical sync signal on line 125 to the AND gate 115.

The system of FIG. 11 may be substituted for the film sync detection circuit 20 and the counter 43 in the system of FIG. 2.

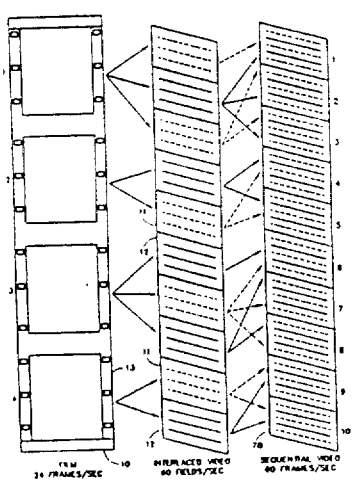

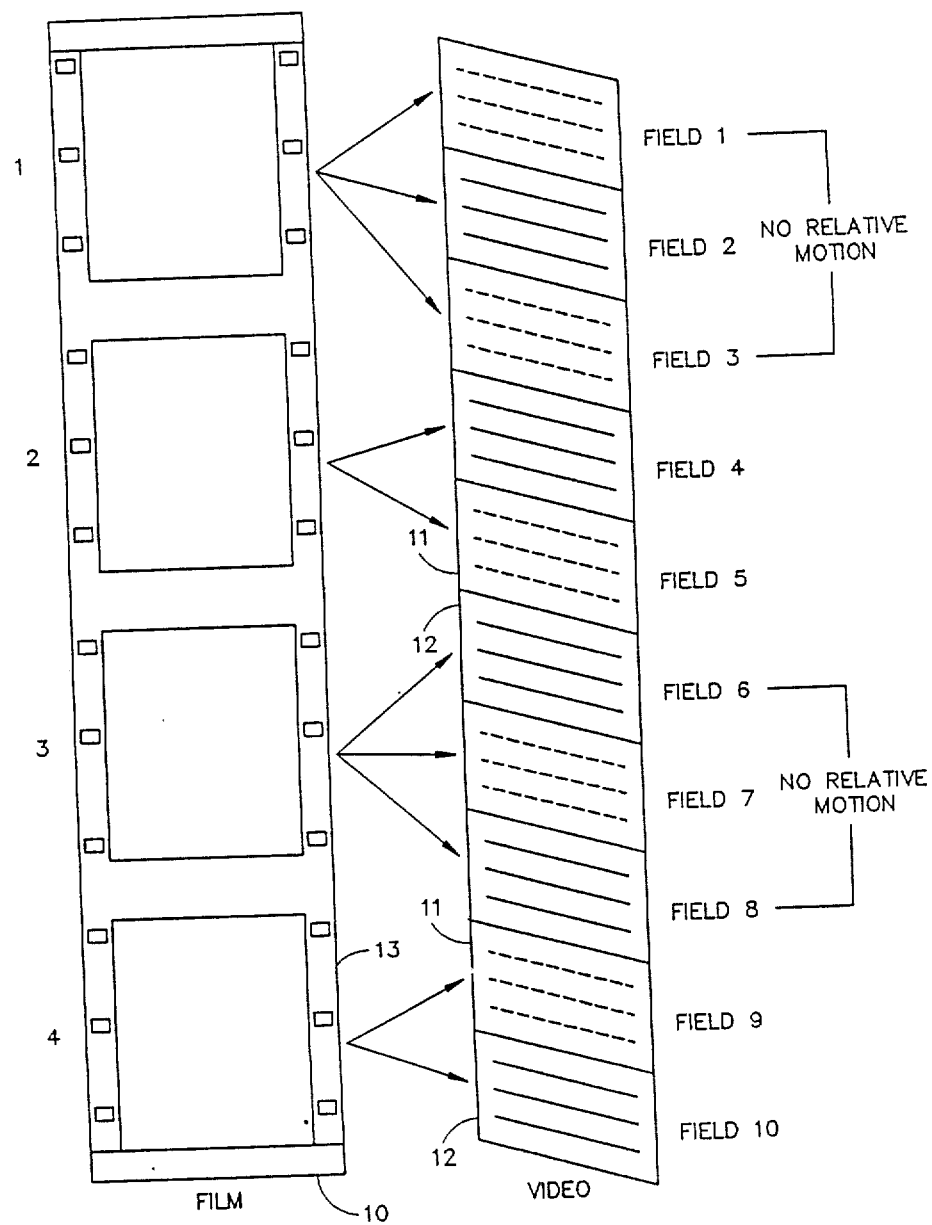

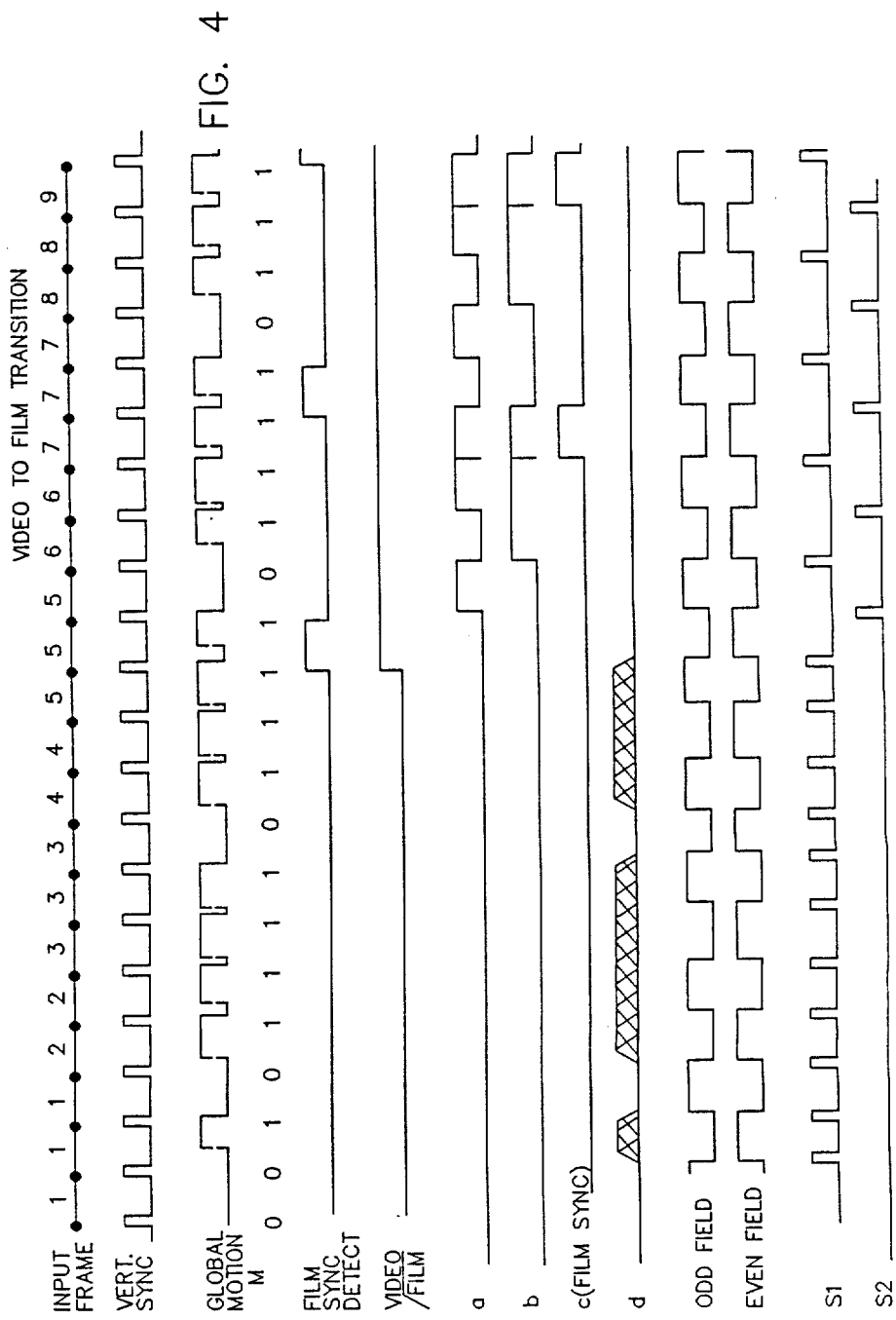

We claim:

1. A system for determining the sequential position of video fields of a received video signal that was derived from a film having successive image frames, with the video fields having been produced at a greater rate than the film frame rate and in a predetermined repetitive sequentially varying relationship to the film frames wherein at predetermined positions in the sequence a video field is identical to the video field preceded it by the duration of a given number of video fields, the system comprising means for delaying each field of the received video signal;

means for comparing each received video field with a video field that has been delayed by the duration of said given number of video fields; and means for comparing the results of a successive number of said comparisons with the predetermined sequence to determine when identical fields are located in only said predetermined positions in a sequence of the compared received video fields.

2. A system for processing a received video signal that was derived from film to indicate the sequential position of video fields in a video signal that was derived from a film having successive image frames, with the video fields having been produced at a greater rate than the film frame rate and in a predetermined repetitive sequentially varying relationship to the film frames wherein at predetermined positions in the sequence a video field is identical to the video field that preceded it by the duration of a given number of video fields, the system comprising means for delaying each field of the received video signal;

means for comparing each received video field with a video field that has been delayed by the duration of the given number of video fields;

means for comparing the results of successive number of said comparisons with the predetermined sequence to determine when identical fields are located in only said predetermined positions in a sequence of the compared received video fields; and means synchronized by said determination that indentical fields are located in only said predetermined positions in a sequence of the compared received video fields, for inserting indications of sequential video field position in the received video signal.

3. A system for determining whether a received video signal having video fields was derived from a film having successive image frames, with the video fields having been produced at a greater rate than the film frame rate and in a predetermined repetitive sequentially varying relationship to the film frames wherein at predetermined positions in the sequence a video field is identical to the video field that preceded it by the duration of a given number of video fields, the system comprising means for delaying each field of the received video signal;

means for comparing each received video field with a video field that has been delayed by the duration of said given number of video fields;

means for comparing the results of a successive number of said comparison with the predetermined sequence to determine if identical fields are located in only said predetermined positions in a sequence of the compared received video fields; and means for timing said comparisons of said compared results with the predetermined sequence and for providing an indication that the received video fields were not so derived from film when a determination that identical fields are located in only said predetermined positions in a sequence of the compared received video fields, is not made within a predetermined time.

4. A system for providing a progressive-scan video display signal from a received video signal that may or may not have been derived from film, comprising means for determining whether the received video signal was derived from a film having successive image frames by producing odd and even video fields from each film frame, with the video fields being produced at a greater rate than the film frame rate and in a repetitive sequentially varying relationship to the film frames;

means for delaying each field of the received video signal;

means responsive to a determination that the received video signal was so derived from film, for combining the received and delayed video fields to provide a progressive-scan video frame signal at the video field rate, in which alternate lines are derived respectively from odd and even video fields; and means responsive to a determination that the received video signal was not so derived from film, for combining the predetermined portions of the received signal to provide a progressive-scan video frame signal at the video field rate.

5. A system according to claim 4, wherein the determining means are adapted for determining whether a received video signal having video field was derived from a film having successive image frames, with the fields having been produced at a greater rate than the film frame rate and in a predetermined repetitive sequentially varying relationship to the film frames wherein at predetermined positions in the sequence a video field is identical to the video field that preceded it by the duration of a given number of video fields, with the determining means comprising means for comparing each received video field with a video field that has been delayed by the duration of said given number of fields;

means for comparing the results of a successive number of said comparisons with the predetermined sequence to determine if identical fields are located in only said predetermined positions in a sequence of the compared received video fields; and means for timing said comparisons of said compared results with the predetermined sequence and for providing an indication that the received video fields were not so derived from film when a determination that identical fields are located in only said predetermined positions in a sequence of the compared received video fields, is not made within a predetermined time.

6. A system for processing a video signal as it is derived from film to indicate the sequential position of video fields in the video signal, when the signal is derived from a film having successive image frames, with the video fields being produced at a greater rate than the film frame rate and in a predetermined repetitive sequentially varying relationship to the film frames, the system comprising means coupled to the video field derivation means for providing an indication of the sequential positions of the video fields as the fields are being derived; and means synchronized by said provided indication for inserting indications of sequential video field position in the derived video signal.

* * * * *

UNITED STATES PATENT AND TRADEMARK OFFICE
CERTIFICATE OF CORRECTION

PATENT NO. : 4,998,287

DATED : March 5, 1991

INVENTOR(S) : Ron D. Katznelson and Edward A. Krause

It is certified that error appears in the above-identified patent and that said Letters Patent is hereby corrected as shown below:

The title page, showing the illustrative figure, should be deleted and and substitute therefor the attached title page.

In the drawing, cancel Figures 1 through 14, and insert the following Figures 1 through 11.

Column 1, line 33, after "from", insert --every four film frames 13 with the first video field being an odd field derived from--.

Column 4, line 18, after "frames", insert --from--.

Column 6, line 28, change "anf" to --and--.

Column 9, line 32, change "field" to --fields--.

Column 9, line 34, before "fields", insert --video--.

Signed and Sealed this

Twenty-fifth Day of August, 1992

Attest:

DOUGLAS B. COMER

*Attesting Officer*    *Acting Commissioner of Patents and Trademarks*

United States Patent [19]

Katznelson et al.

[11] Patent Number: 4,998,287
[45] Date of Patent: Mar. 5, 1991

[54] DETERMINATION OF SEQUENTIAL POSITIONS OF VIDEO FIELDS DERIVED FROM FILM

[75] Inventors: Ron D. Katznelson; Edward A. Krause, both of San Diego, Calif.

[73] Assignee: General Instrument Corporation, New York, N.Y.

[21] Appl. No.: 257,712

[22] Filed: Oct. 14, 1988

[51] Int. Cl.$^5$ .............................................. H04N 3/36
[52] U.S. Cl. ........................................ 382/34; 358/214
[58] Field of Search ................................ 358/214–216; 382/30, 34

[56] References Cited

U.S. PATENT DOCUMENTS

| | | | |
|---|---|---|---|
| 4,418,360 | 11/1983 | Glasgow | 358/214 |
| 4,641,188 | 2/1987 | Dischert | 358/214 |
| 4,680,638 | 7/1987 | Childs | 358/214 |
| 4,814,885 | 3/1989 | Beard | 358/214 |
| 4,914,520 | 4/1990 | Beard | 358/214 |
| 4,933,759 | 6/1990 | van der Meer et al. | 358/214 |

OTHER PUBLICATIONS

Tsinberg, "Phillips NTSC-Compatible Two-Channel Television System", Third International Colloquium on Advanced Television Systems: HDTV87, Oct. 4–8, 1987, Ottawa, Canada.

Isnardi, et al., "A Single Channel, NTSC Compatible Widescreen EDTV Syst., Third International Colloquium on Advanced Television Systems": HDTV87, Oct. 4–8, Ottawa, Canada.

Lucas, "B-MAC and HDTV-How Does It Fit?" Third International Colloquium on Advanced Television Systems: HDTV87, Oct. 4–8, Ottawa, Canada.

Poetsch, et al. "FDL 60–Progress in Film Scanning Using CCD Sensors and Digital Processing" International Broadcast Engineer, vol. 14, No. 190, Jul. 1983, pp. 46–48.

Primary Examiner—Stephen Brinich
Attorney, Agent, or Firm—Edward W. Callan

[57] ABSTRACT

A system for determining the sequential position of video fields of a received video signal that was derived from a film having successive image frames in accordance with the 3:2 pulldown method, wherein the video fields are produced at a greater rate than the film frame rate and in a predetermined repetitive sequentially varying relationship to the film frames wherein at predetermined positions in the sequence a video field is identical to the video field that preceded it by the duration of two video fields. The system includes means for delaying each field of the received video signal; means for comparing each received video field with a video field that has been delayed by the duration of two video fields; and means for comparing the results of a successive number of said comparisons with the predetermined sequence to determine when identical fields are located in only said predetermined positions in a sequence of the compared received video fields. A video signal processing system is synchronized by said determination that identical fields are located in only said predetermined positions in a sequence of the compared received video fields, for inserting indications of sequential video field position in the vertical blanking intervals preceding video fields that are received subsequent to said synchronizing determination. A counter times said comparisons of said compared results with the predetermined sequence and provides an indication that the received video fields were not so derived from film when a determination that identical fields are located in only said predetermined positions in a sequence of the compared received video fields, is not made within a predetermined time. This indication is used to set the mode of operation of a system for providing a progressive-scan video display in accordance with whether or not the received video signal was derived from film.

6 Claims, 11 Drawing Sheets